(12) United States Patent
Takabe

(10) Patent No.: US 10,897,481 B2
(45) Date of Patent: Jan. 19, 2021

(54) RELAY DEVICE, METHOD AND NON-TRANSITORY COMPUTER-READABLE STORAGE MEDIUM

(71) Applicant: FUJITSU LIMITED, Kawasaki (JP)

(72) Inventor: Yoshihiro Takabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 225 days.

(21) Appl. No.: 15/979,022

(22) Filed: May 14, 2018

(65) Prior Publication Data
US 2018/0337945 A1    Nov. 22, 2018

(30) Foreign Application Priority Data

May 17, 2017    (JP) .................................. 2017-098005

(51) Int. Cl.
*H04L 29/06* (2006.01)
*H04L 12/26* (2006.01)
*H04L 29/08* (2006.01)

(52) U.S. Cl.
CPC ........ *H04L 63/1458* (2013.01); *H04L 43/028* (2013.01); *H04L 43/045* (2013.01); *H04L 43/062* (2013.01); *H04L 43/16* (2013.01); *H04L 63/1425* (2013.01); *H04L 63/0254* (2013.01); *H04L 67/16* (2013.01)

(58) Field of Classification Search
CPC . H04L 47/10; H04L 63/1416; H04L 63/1425; H04L 63/1458; H04L 63/1408; H04L 63/1441; H04L 63/145; H04L 63/20; H04L 63/0227; H04L 2463/141; H04L 2463/144; H04L 63/0236; H04L 63/02; H04L 63/0254
See application file for complete search history.

(56) References Cited

U.S. PATENT DOCUMENTS

| | | | | |
|---|---|---|---|---|
| 8,117,657 B1 * | 2/2012 | Elrod | .................. | H04L 63/1466 726/23 |
| 8,613,089 B1 * | 12/2013 | Holloway | ........... | H04L 63/1425 726/23 |
| 8,997,224 B1 * | 3/2015 | Lu | ....................... | H04L 63/1441 726/22 |
| 10,320,813 B1 * | 6/2019 | Ahmed | ............... | H04L 63/1441 |

(Continued)

FOREIGN PATENT DOCUMENTS

| | | |
|---|---|---|
| JP | 2006-157601 | 6/2006 |
| JP | 2006-352669 | 12/2006 |

*Primary Examiner* — Matthew Smithers
*Assistant Examiner* — Mirza Israr Javed
(74) *Attorney, Agent, or Firm* — Fujitsu Patent Center

(57) ABSTRACT

A relay device coupled to a network including a plurality of information processing devices, the relay device includes a port coupled to any one of the plurality of information processing devices, and a processor coupled to the port and configured to specify a first number which is a number of packets of a first communication protocol transmitted from the port, specify a second number which is a number of packets of the first communication protocol received at the port, and determine, based on comparison of a ratio of the first number and the second number and a threshold corresponding to a third number which is a number of the plurality of information processing devices included in the network, whether an attack by at least one information processing device of the plurality of information processing devices occurs.

14 Claims, 50 Drawing Sheets

(56) References Cited

U.S. PATENT DOCUMENTS

| | | | | |
|---|---|---|---|---|
| 2002/0053058 A1* | 5/2002 | Lee | ........................ | H04L 1/1845 714/748 |
| 2002/0083175 A1* | 6/2002 | Afek | ................... | H04L 63/1458 709/225 |
| 2004/0054925 A1* | 3/2004 | Etheridge | ........... | H04L 63/1458 726/22 |
| 2004/0165575 A1* | 8/2004 | Yang | .................... | H04L 1/0002 370/349 |
| 2006/0031888 A1* | 2/2006 | Sparrell | ........... | H04N 21/43615 725/78 |
| 2006/0107318 A1* | 5/2006 | Jeffries | ............... | H04L 63/1458 726/22 |
| 2006/0288413 A1* | 12/2006 | Kubota | ............... | H04L 63/1458 726/23 |
| 2007/0209074 A1* | 9/2007 | Coffman | ............... | H04L 63/145 726/23 |
| 2007/0220606 A1* | 9/2007 | Omote | .................... | G06F 21/56 726/24 |
| 2008/0109730 A1* | 5/2008 | Coffman | ................ | G06Q 30/02 715/733 |
| 2009/0271865 A1* | 10/2009 | Jiang | ........................ | H04L 69/22 726/23 |
| 2009/0296597 A1* | 12/2009 | Yasuie | ................ | H04L 43/0829 370/252 |
| 2010/0238855 A1* | 9/2010 | Yoshida | .............. | H04W 84/047 370/315 |
| 2011/0026535 A1* | 2/2011 | Ajitomi | ............... | H04L 12/4625 370/401 |
| 2011/0261691 A1* | 10/2011 | Jin | ........................ | H04L 47/193 370/230 |
| 2011/0261710 A1* | 10/2011 | Chen | ................... | H04L 43/0876 370/252 |
| 2011/0317566 A1* | 12/2011 | Keeni | ................. | H04L 63/1425 370/252 |
| 2013/0081136 A1* | 3/2013 | Jiang | .................. | H04L 63/1425 726/22 |
| 2013/0246507 A1* | 9/2013 | Amemiya | ............... | H04L 67/14 709/203 |
| 2014/0150102 A1* | 5/2014 | Wang | .................. | H04L 63/1416 726/23 |
| 2015/0007314 A1* | 1/2015 | Vaughan | ............... | H04L 63/1425 726/23 |
| 2015/0180757 A1* | 6/2015 | Oshiba | ................ | H04L 43/0882 370/252 |
| 2016/0381143 A1* | 12/2016 | Malik | ................... | H04L 12/189 455/518 |
| 2017/0257225 A1* | 9/2017 | Pan | ....................... | G05B 19/042 |
| 2017/0272979 A1* | 9/2017 | Lee | ........................ | H04W 28/20 |
| 2018/0084058 A1* | 3/2018 | Ajitomi | ................ | H04W 12/06 |
| 2018/0255080 A1* | 9/2018 | Paine | ................... | G06F 21/552 |
| 2018/0337945 A1* | 11/2018 | Takabe | ................. | H04L 43/062 |

* cited by examiner

FIG. 5

| NUMBER OF TRANSMITTED SSDP MULTICAST PACKETS | NUMBER OF RECEIVED SSDP UNICAST PACKETS |
|---|---|
| 3 | 32 |
| 3 | 33 |
| 3 | 35 |
| 3 | 31 |
| 3 | 30 |
| 3 | 36 |
| 3 | 39 |
| 3 | 31 |
| ⋮ | ⋮ |

FIG. 6

| NUMBER OF TRANSMITTED SSDP MULTICAST PACKETS | NUMBER OF RECEIVED SSDP UNICAST PACKETS |
|---|---|
| 3 | 32 |
| 3 | 34 |
| 3 | 31 |
| 3 | 30 |
| 3 | 29 |
| 3 | 35 |
| 3 | 38 |
| 3 | 31 |
| ⋮ | ⋮ |

FIG. 7

| NUMBER OF TRANSMITTED SSDP MULTICAST PACKETS | NUMBER OF RECEIVED SSDP UNICAST PACKETS |
|---|---|
| 3 | 34 |
| 3 | 35 |
| 3 | 32 |
| 3 | 31 |
| 3 | 36 |
| 3 | 30 |
| 3 | 33 |
| 3 | 31 |
| ⋮ | ⋮ |

FIG. 9

| TOTAL NUMBER OF UPnP DEVICES | NUMBER OF TRANSMITTED SSDP MULTICAST PACKETS | NUMBER OF RECEIVED SSDP UNICAST PACKETS | PACKET RATIO |
|---|---|---|---|
| 4 | 3 | 32 | 10.66666667 |
| 4 | 3 | 33 | 11 |
| 4 | 3 | 35 | 11.66666667 |
| 4 | 3 | 31 | 10.33333333 |
| 4 | 3 | 30 | 10 |
| 4 | 3 | 36 | 12 |
| 4 | 3 | 39 | 13 |
| 4 | 3 | 31 | 10.33333333 |
| ⋮ | ⋮ | ⋮ | ⋮ |

FIG. 10

| TOTAL NUMBER OF UPnP DEVICES | NUMBER OF TRANSMITTED SSDP MULTICAST PACKETS | NUMBER OF RECEIVED SSDP UNICAST PACKETS | PACKET RATIO |
|---|---|---|---|
| 4 | 3 | 32 | 10.66666667 |
| 4 | 3 | 34 | 11.33333333 |
| 4 | 3 | 31 | 10.33333333 |
| 4 | 3 | 30 | 10 |
| 4 | 3 | 29 | 9.66666667 |
| 4 | 3 | 35 | 11.66666667 |
| 4 | 3 | 38 | 12.66666667 |
| 4 | 3 | 31 | 10.33333333 |
| ⋮ | ⋮ | ⋮ | ⋮ |

FIG. 11

| TOTAL NUMBER OF UPnP DEVICES | NUMBER OF TRANSMITTED SSDP MULTICAST PACKETS | NUMBER OF RECEIVED SSDP UNICAST PACKETS | PACKET RATIO |
|---|---|---|---|
| 4 | 3 | 34 | 11.33333333 |
| 4 | 3 | 35 | 11.66666667 |
| 4 | 3 | 32 | 10.66666667 |
| 4 | 3 | 31 | 10.33333333 |
| 4 | 3 | 36 | 12 |
| 4 | 3 | 30 | 10 |
| 4 | 3 | 33 | 11 |
| 4 | 3 | 31 | 10.33333333 |
| ⋮ | ⋮ | ⋮ | ⋮ |

FIG. 17

| NUMBER OF TRANSMITTED SSDP MULTICAST PACKETS | NUMBER OF RECEIVED SSDP UNICAST PACKETS |
|---|---|
| 3 | 3020 |

FIG. 18

| NUMBER OF TRANSMITTED SSDP MULTICAST PACKETS | NUMBER OF RECEIVED SSDP UNICAST PACKETS |
|---|---|
| 3 | 32 |

FIG. 19

| NUMBER OF TRANSMITTED SSDP MULTICAST PACKETS | NUMBER OF RECEIVED SSDP UNICAST PACKETS |
|---|---|
| 300 | 34 |

FIG. 20

| TOTAL NUMBER OF UPnP DEVICES | NUMBER OF TRANSMITTED SSDP MULTICAST PACKETS | NUMBER OF RECEIVED SSDP UNICAST PACKETS | PACKET RATIO |
|---|---|---|---|
| 4 | 3 | 3020 | 1006.666667 |

FIG. 21

| TOTAL NUMBER OF UPnP DEVICES | NUMBER OF TRANSMITTED SSDP MULTICAST PACKETS | NUMBER OF RECEIVED SSDP UNICAST PACKETS | PACKET RATIO |
|---|---|---|---|
| 4 | 3 | 32 | 10.66666667 |

FIG. 22

| TOTAL NUMBER OF UPnP DEVICES | NUMBER OF TRANSMITTED SSDP MULTICAST PACKETS | NUMBER OF RECEIVED SSDP UNICAST PACKETS | PACKET RATIO |
|---|---|---|---|
| 4 | 300 | 34 | 0.11333333 |

FIG. 27

| NUMBER OF TRANSMITTED SSDP MULTICAST PACKETS | NUMBER OF RECEIVED SSDP UNICAST PACKETS |
|---|---|
| 3 | 3020 |

FIG. 28

| NUMBER OF TRANSMITTED SSDP MULTICAST PACKETS | NUMBER OF RECEIVED SSDP UNICAST PACKETS |
|---|---|
| 150 | 32 |

FIG. 29

| NUMBER OF TRANSMITTED SSDP MULTICAST PACKETS | NUMBER OF RECEIVED SSDP UNICAST PACKETS |
|---|---|
| 150 | 34 |

FIG. 35

| NUMBER OF TRANSMITTED SSDP MULTICAST PACKETS | NUMBER OF RECEIVED SSDP UNICAST PACKETS |
|---|---|
| 3 | 32 |
| 3 | 33 |
| 3 | 35 |
| 3 | 31 |
| 3 | 30 |
| 3 | 36 |
| 3 | 39 |
| 3 | 31 |
| ⋮ | ⋮ |

FIG. 36

| NUMBER OF TRANSMITTED SSDP MULTICAST PACKETS | NUMBER OF RECEIVED SSDP UNICAST PACKETS |
|---|---|
| 3 | 32 |
| 3 | 34 |
| 3 | 31 |
| 3 | 30 |
| 3 | 29 |
| 3 | 35 |
| 3 | 38 |
| 3 | 31 |
| ⋮ | ⋮ |

FIG. 37

| NUMBER OF TRANSMITTED SSDP MULTICAST PACKETS | NUMBER OF RECEIVED SSDP UNICAST PACKETS |
|---|---|
| 3 | 34 |
| 3 | 35 |
| 3 | 32 |
| 3 | 31 |
| 3 | 36 |
| 3 | 30 |
| 3 | 33 |
| 3 | 31 |
| ⋮ | ⋮ |

FIG. 38

| TOTAL NUMBER OF UPnP DEVICES | NUMBER OF TRANSMITTED SSDP MULTICAST PACKETS | NUMBER OF RECEIVED SSDP UNICAST PACKETS | PACKET RATIO |
|---|---|---|---|
| 8 | 3 | 32 | 10.66666667 |
| 8 | 3 | 33 | 11 |
| 8 | 3 | 35 | 11.66666667 |
| 8 | 3 | 31 | 10.33333333 |
| 8 | 3 | 30 | 10 |
| 8 | 3 | 36 | 12 |
| 8 | 3 | 39 | 13 |
| 8 | 3 | 31 | 10.33333333 |
| ⋮ | ⋮ | ⋮ | ⋮ |

FIG. 39

| TOTAL NUMBER OF UPnP DEVICES | NUMBER OF TRANSMITTED SSDP MULTICAST PACKETS | NUMBER OF RECEIVED SSDP UNICAST PACKETS | PACKET RATIO |
|---|---|---|---|
| 8 | 3 | 32 | 10.66666667 |
| 8 | 3 | 34 | 11.33333333 |
| 8 | 3 | 31 | 10.33333333 |
| 8 | 3 | 30 | 10 |
| 8 | 3 | 29 | 9.66666667 |
| 8 | 3 | 35 | 11.66666667 |
| 8 | 3 | 38 | 12.66666667 |
| 8 | 3 | 31 | 10.33333333 |
| ⋮ | ⋮ | ⋮ | ⋮ |

FIG. 40

| TOTAL NUMBER OF UPnP DEVICES | NUMBER OF TRANSMITTED SSDP MULTICAST PACKETS | NUMBER OF RECEIVED SSDP UNICAST PACKETS | PACKET RATIO |
|---|---|---|---|
| 8 | 3 | 34 | 11.33333333 |
| 8 | 3 | 35 | 11.66666667 |
| 8 | 3 | 32 | 10.66666667 |
| 8 | 3 | 31 | 10.33333333 |
| 8 | 3 | 36 | 12 |
| 8 | 3 | 30 | 10 |
| 8 | 3 | 33 | 11 |
| 8 | 3 | 31 | 10.33333333 |
| ⋮ | ⋮ | ⋮ | ⋮ |

FIG. 41

| NUMBER OF TRANSMITTED SSDP MULTICAST PACKETS | NUMBER OF RECEIVED SSDP UNICAST PACKETS |
|---|---|
| 3 | 3211 |

FIG. 42

| NUMBER OF TRANSMITTED SSDP MULTICAST PACKETS | NUMBER OF RECEIVED SSDP UNICAST PACKETS |
|---|---|
| 3 | 32 |

FIG. 43

| NUMBER OF TRANSMITTED SSDP MULTICAST PACKETS | NUMBER OF RECEIVED SSDP UNICAST PACKETS |
|---|---|
| 300 | 34 |

FIG. 46

| NUMBER OF TRANSMITTED SSDP MULTICAST PACKETS | NUMBER OF RECEIVED SSDP UNICAST PACKETS |
|---|---|
| 3 | 3020 |

FIG. 47

| NUMBER OF TRANSMITTED SSDP MULTICAST PACKETS | NUMBER OF RECEIVED SSDP UNICAST PACKETS |
|---|---|
| 3 | 32 |

FIG. 48

| NUMBER OF TRANSMITTED SSDP MULTICAST PACKETS | NUMBER OF RECEIVED SSDP UNICAST PACKETS |
|---|---|
| 3 | 34 |

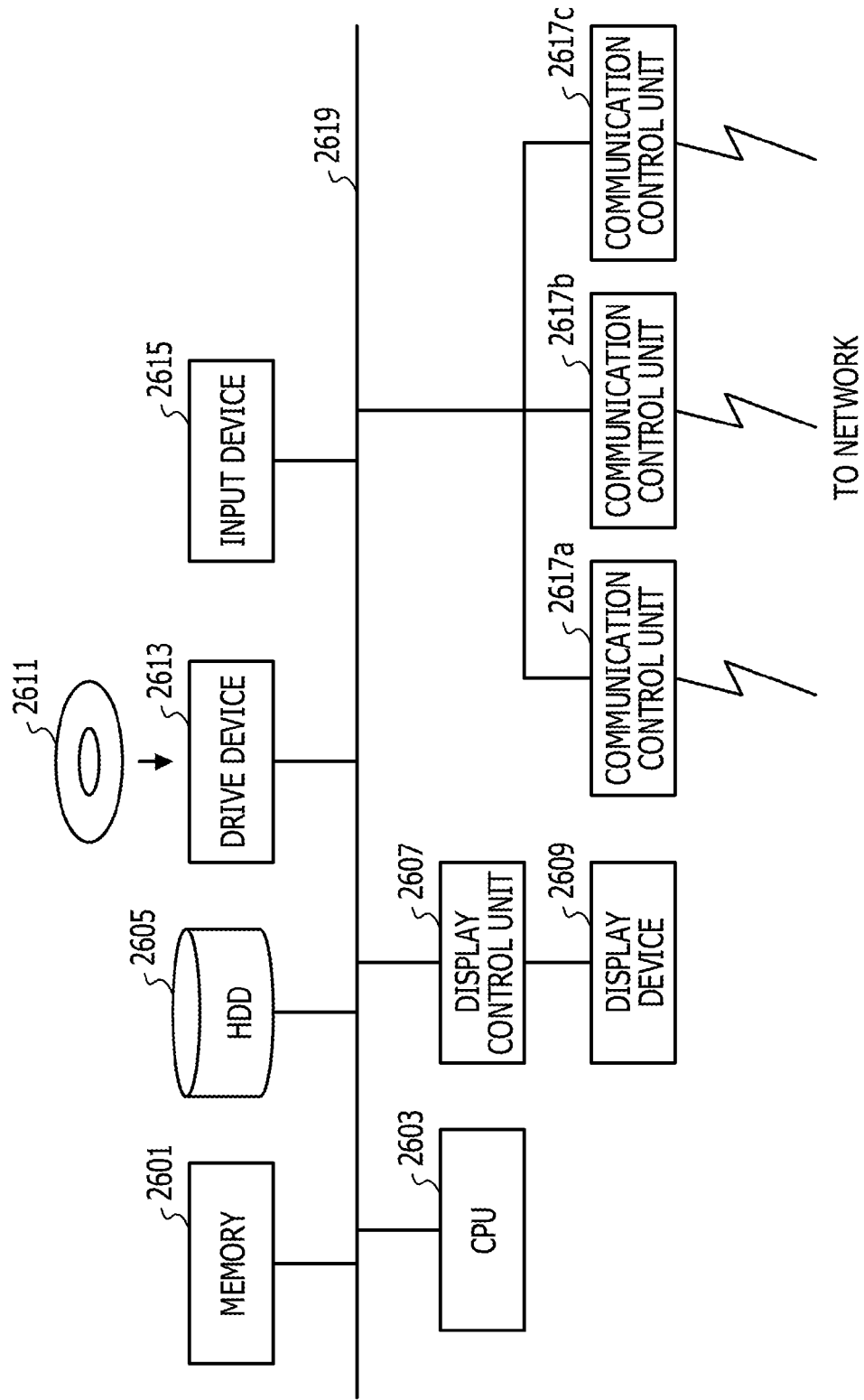

RELAY DEVICE, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-98005, filed on May 17, 2017, the entire contents of which are incorporated herein by reference.

FIELD

The embodiments discussed herein are related to a relay device, a method and a non-transitory computer-readable storage medium.

BACKGROUND

A simple service discovery protocol (SSDP) is one of protocols used for device detection by universal plug and play (UPnP). In the SSDP, a control point in a network transmits an M-SEARCH request by multicast. A UPnP device in the network transmits device information of the UPnP device by unicast as a response to the M-SEARCH request.

A reflector attack is a kind of a distributed denial of service (DDoS) attack for sending a large amount of data from a large number of devices at the same time to occupy a network band. The SSDP is easily used for the reflector attack because (1) all UPnP-enabled devices return responses to the M-SEARCH request and (2) a size of a response packet is large compared with a request packet.

A conventional technique concerning detection of the network attack is present. However, the conventional technique is a technique assuming attacks other than the reflector attack and is not necessarily suitable for detection of the reflector attack. As prior art documents, there are Japanese Laid-open Patent Publication Nos. 2006-352669 and 2006-157601.

SUMMARY

According to an aspect of the invention, a relay device coupled to a network including a plurality of information processing devices, the relay device includes a port configured to be coupled to any one of the plurality of information processing devices, and a processor coupled to the port and configured to specify a first number which is a number of packets of a first communication protocol transmitted from the port, specify a second number which is a number of packets of the first communication protocol received at the port, and determine, based on comparison of a ratio of the first number and the second number and a threshold corresponding to a third number which is a number of the plurality of information processing devices included in the network, whether an attack by at least one information processing device of the plurality of information processing devices occurs.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of data managed by the port monitoring unit;
FIG. 6 is a diagram illustrating an example of data managed by the port monitoring unit;
FIG. 7 is a diagram illustrating an example of data managed by the port monitoring unit;
FIG. 9 is a diagram illustrating an example of data stored in an aggregated-data storing unit;
FIG. 10 is a diagram illustrating an example of data stored in the aggregated-data storing unit;
FIG. 11 is a diagram illustrating an example of data stored in the aggregated-data storing unit;
FIG. 17 is a diagram illustrating the number of SSDP packets counted by the port monitoring unit;
FIG. 18 is a diagram illustrating the number of SSDP packets counted by the port monitoring unit;
FIG. 19 is a diagram illustrating the number of SSDP packets counted by the port monitoring unit;
FIG. 20 is data generated based on the number of SSDP packets counted by the port monitoring unit;
FIG. 21 is data generated based on the number of SSDP packets counted by the port monitoring unit;
FIG. 22 is data generated based on the number of SSDP packets counted by the port monitoring unit;
FIG. 27 is a diagram illustrating the number of SSDP packets counted by the port monitoring unit;
FIG. 28 is a diagram illustrating the number of SSDP packets counted by the port monitoring unit;
FIG. 29 is a diagram illustrating the number of SSDP packets counted by the port monitoring unit.

FIG. 35 is a diagram illustrating the number of SSDP packets counted by a port monitoring unit;

FIG. 36 is a diagram illustrating the number of SSDP packets counted by the port monitoring unit;

FIG. 37 is a diagram illustrating the number of SSDP packets counted by the port monitoring unit;

FIG. 38 is data generated based on the number of SSDP packets counted by the port monitoring unit;

FIG. 39 is data generated based on the number of SSDP packets counted by the port monitoring unit;

FIG. 40 is data generated based on the number of SSDP packets counted by the port monitoring unit;

FIG. 41 is a diagram illustrating the number of SSDP packets counted by the port monitoring unit;

FIG. 42 is a diagram illustrating the number of SSDP packets counted by the port monitoring unit;

FIG. 43 is a diagram illustrating the number of SSDP packets counted by the port monitoring unit;

FIG. 46 is a diagram illustrating the number of SSDP packets counted by the port monitoring unit;

FIG. 47 is a diagram illustrating the number of SSDP packets counted by the port monitoring unit;

FIG. 48 is a diagram illustrating the number of SSDP packets counted by the port monitoring unit;

FIG. 50 is a hardware configuration diagram of an L2 switch.

DESCRIPTION OF EMBODIMENTS

First Embodiment

Figure 1:
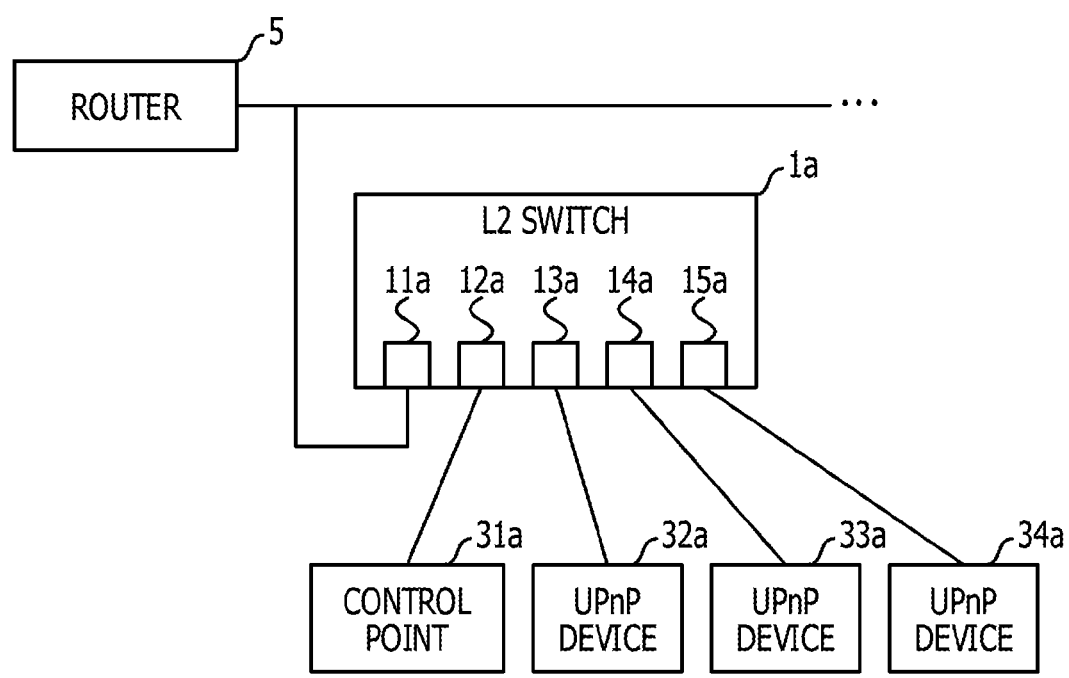
FIG. 1 is a diagram illustrating a system overview in a first embodiment.

FIG. 1 is a diagram illustrating a system overview in a first embodiment. An L (Layer) 2 switch 1*a*, which executes main processing in this embodiment, is coupled to a router 5, a control point 31*a*, which is a server or the like having a function of a control point of SSDP, and UPnP devices 32*a* to 34*a*, which are, for example, personal computers, servers, or printers, via a network such as a local area network (LAN). More specifically, the L2 switch 1*a* is coupled to the router 5 via a port 11*a*, coupled to the control point 31*a* via a port 12*a*, coupled to the UPnP device 32*a* via a port 13*a*, coupled to the UPnP device 33*a* via a port 14*a*, and coupled to the UPnP device 34*a* via a port 15*a*.

Figure 2:
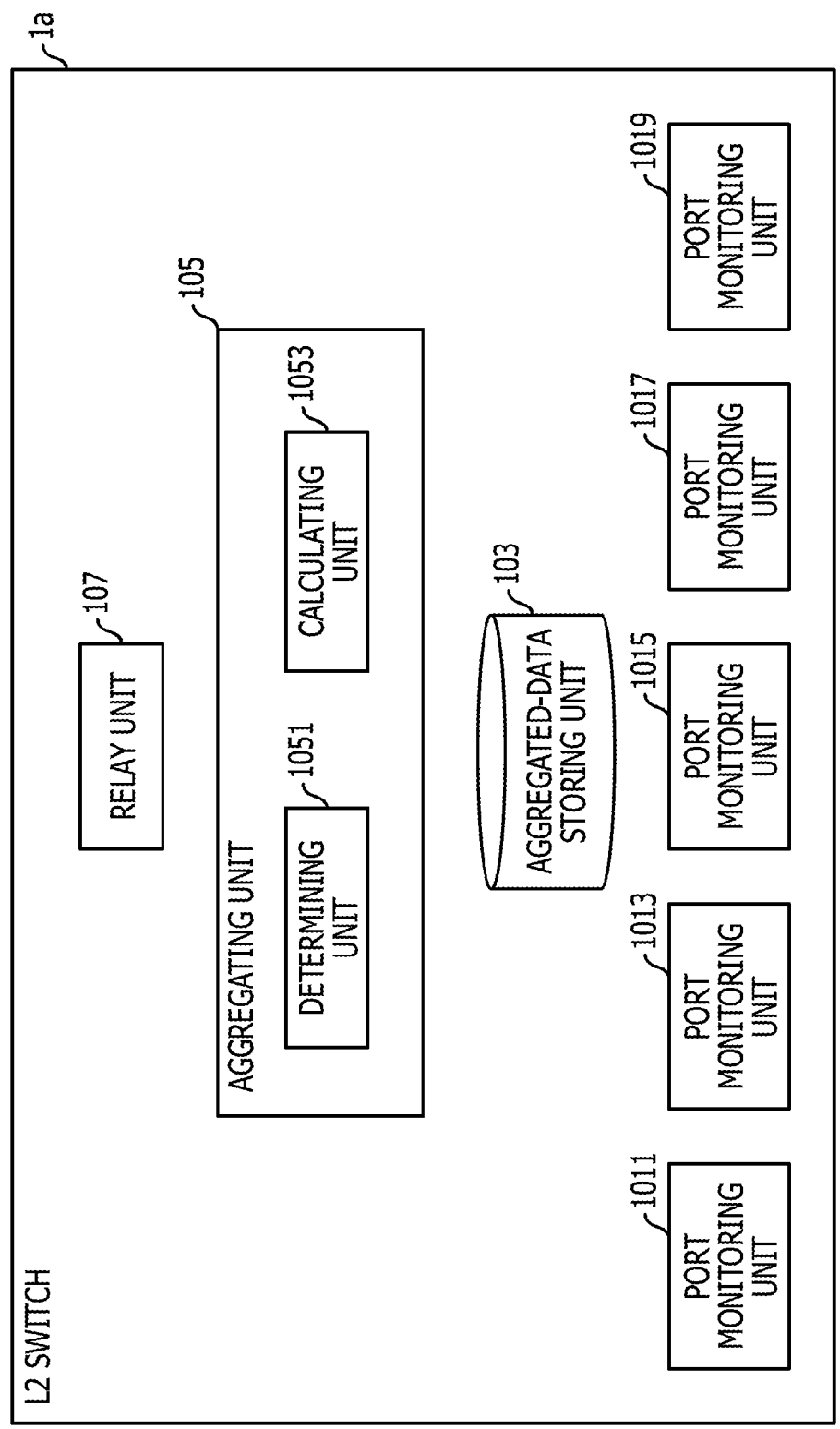
FIG. 2 is a functional block diagram of an L2 switch.

FIG. 2 is a functional block diagram of the L2 switch 1*a*. The L2 switch 1*a* includes port monitoring units 1011 to 1019, an aggregated-data storing unit 103, an aggregating unit 105, and a relay unit 107. The aggregating unit 105 includes a determining unit 1051 and a calculating unit 1053. Each of the port monitoring units 1011 to 1019 monitors one port.

Each of the port monitoring units 1011 to 1019 counts the number of SSDP packets addressed to a device coupled to the monitoring target port and the number of SSDP packets transmitted by the device coupled to the monitoring target port. The SSDP packet is a packet addressed to a 1900/user datagram protocol (UDP) (that is, a UDP packet, a destination port number of which is 1900). The calculating unit 1053 calculates, based on counting results acquired from the port monitoring units 1011 to 1019, a threshold used for determining whether a reflector attack occurs. The determining unit 1051 determines, based on the counting results received from the port monitoring units 1011 to 1019 and the threshold calculated by the calculating unit 1053, whether a reflector attack occurs. Data used for processing by the aggregating unit 105 is stored in the aggregated-data storing unit 103. The relay unit 107 executes processing for relaying a packet received by the L2 switch 1*a*.

The processing executed by the L2 switch 1*a* is explained with reference to FIGS. 3 to 33.

Figure 3:
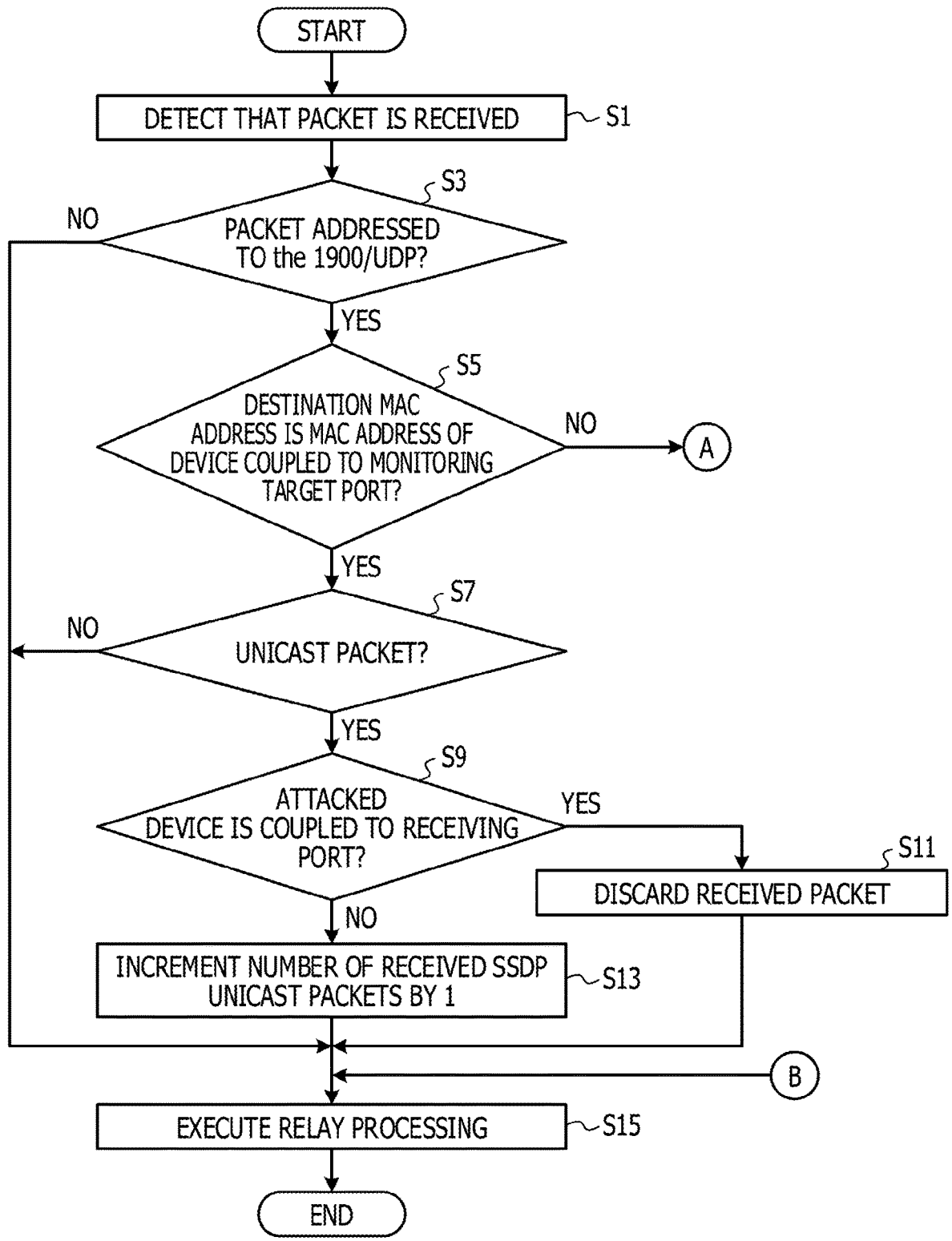
FIG. 3 is a diagram illustrating a processing flow of processing executed by a port monitoring unit.

FIG. 3 is a diagram illustrating a processing flow of processing executed by the port monitoring units 1011 to 1019 of the L2 switch 1*a*. Processing executed by the port monitoring unit 1013, which monitors the port 12*a*, is explained as an example.

The port monitoring unit 1013 detects that the port 12*a* receives a packet from the relay unit 107 or a device coupled the port 12*a* (step S1 in FIG. 3).

The port monitoring unit 1013 determines whether the packet received by the port 12*a* (hereinafter referred to as received packet) is a packet addressed to the 1900/UDP (that is, a UDP packet, a destination port number of which is 1900) (step S3).

When the received packet is not the packet addressed to the 1900/UDP (No route in step S3), since the received packet is not an SSDP packet, the processing shifts to step S15.

On the other hand, when the received packet is the packet addressed to the 1900/UDP (Yes route in step S3), the port monitoring unit 1013 executes the following processing. Specifically, the port monitoring unit 1013 determines whether a destination media access control (MAC) address of the received packet is a MAC address of the device coupled to the port 12*a* (step S5).

Figure 4:
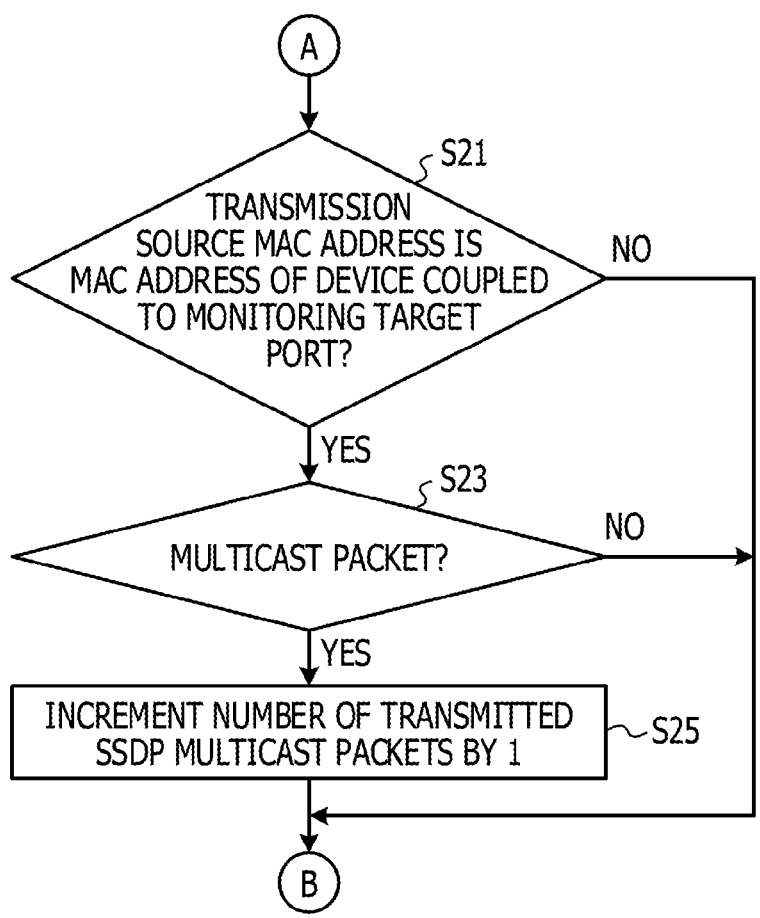
FIG. 4 is a diagram illustrating the processing flow of the processing executed by the port monitoring unit.

When the destination MAC address of the received packet is not the MAC address of the device coupled to the port 12*a* (No route in step S5), the processing shifts to step S21 in FIG. 4 via a terminal A.

On the other hand, when the destination MAC address of the received packet is the MAC address of the device coupled to the port 12*a* (Yes route in step S5), the port monitoring unit 1013 determines whether the received packet is a unicast packet (step S7).

When the received packet is not the unicast packet (No route in step S7), the processing shifts to step S15.

When the received packet is the unicast packet (Yes route in step S7), the port monitoring unit 1013 determines whether a device, which is an attacked device, is coupled to a receiving port (step S9). When the device, which is the attacked device, is coupled, the port monitoring unit 1013 receives a notification in step S55 explained below from the determining unit 1051. Therefore, determination in step S9 is performed based on whether the notification in step S55 is received.

When the device, which is the attacked device, is coupled to the receiving port (Yes route in step S9), the port monitoring unit 1013 discards the received packet (step S11).

On the other hand, when the device, which is the attacked device, is not coupled to the receiving port (No route in step S9), the port monitoring unit 1013 increments the number of received SSDP unicast packets managed by the port monitoring unit 1013 by one (step S13).

The port monitoring unit 1013 instructs the relay unit 107 to process the received packet. In response to the instruction, the relay unit 107 executes relay processing (step S15). Specifically, when the received packet is a packet received from the device coupled to the port 12*a*, the relay unit 107 transfers the received packet to a destination UPnP device or an L2 switch coupled to the UPnP device. When the received packet is a packet received from the relay unit 107, the relay unit 107 outputs the received packet from the port 12*a*.

Note that, in this embodiment, the number of received SSDP unicast packets and the number of transmitted SSDP multicast packets within a predetermined time (for example, one minute) is counted. Therefore, the number of received SSDP unicast packets and the number of transmitted SSDP multicast packets are reset by the determining unit 1051 at every predetermined time.

FIG. 4 is a diagram illustrating a processing flow of processing after the terminal A. The port monitoring unit 1013 determines whether a transmission source MAC address of the received packet is a MAC address of the device coupled to the port 12*a* (step S21 in FIG. 4).

When the transmission source MAC address of the received packet is not the MAC address of the device coupled to the port 12*a* (No route in step S21), the processing shifts to step S15 in FIG. 3 via a terminal B.

On the other hand, when the transmission source MAC address of the received packet is the MAC address of the device coupled to the port 12*a* (Yes route in step S21), the port monitoring unit 1013 determines whether the received packet is a multicast packet (step S23).

When the received packet is not the multicast packet (No route in step S23), the processing shifts to step S15 in FIG. 3 via the terminal B.

On the other hand, when the received packet is the multicast packet (Yes route in step S23), the port monitoring unit 1013 increments the number of transmitted SSDP multicast packets managed by the port monitoring unit 1013 by one (step S25). The processing shifts to step S15 in FIG. 3 via the terminal B.

When the port monitoring units 1011 to 1019 execute the processing explained above, the number of transmitted SSDP multicast packets and the number of received SSDP unicast packets within the predetermined time are counted concerning the ports. FIG. 5 is a diagram illustrating an example of data managed by the port monitoring unit 1013. FIG. 6 is a diagram illustrating an example of data managed by the port monitoring unit 1017. FIG. 7 is a diagram illustrating an example of data managed by the port monitoring unit 1019. In FIGS. 5 to 7, histories of the number of transmitted SSDP multicast packets and the number of received SSDP unicast packets within the predetermined time are included.

Processing executed by the determining unit 1051 of the aggregating unit 105 is explained with reference to FIGS. 8 to 16.

Figure 8:
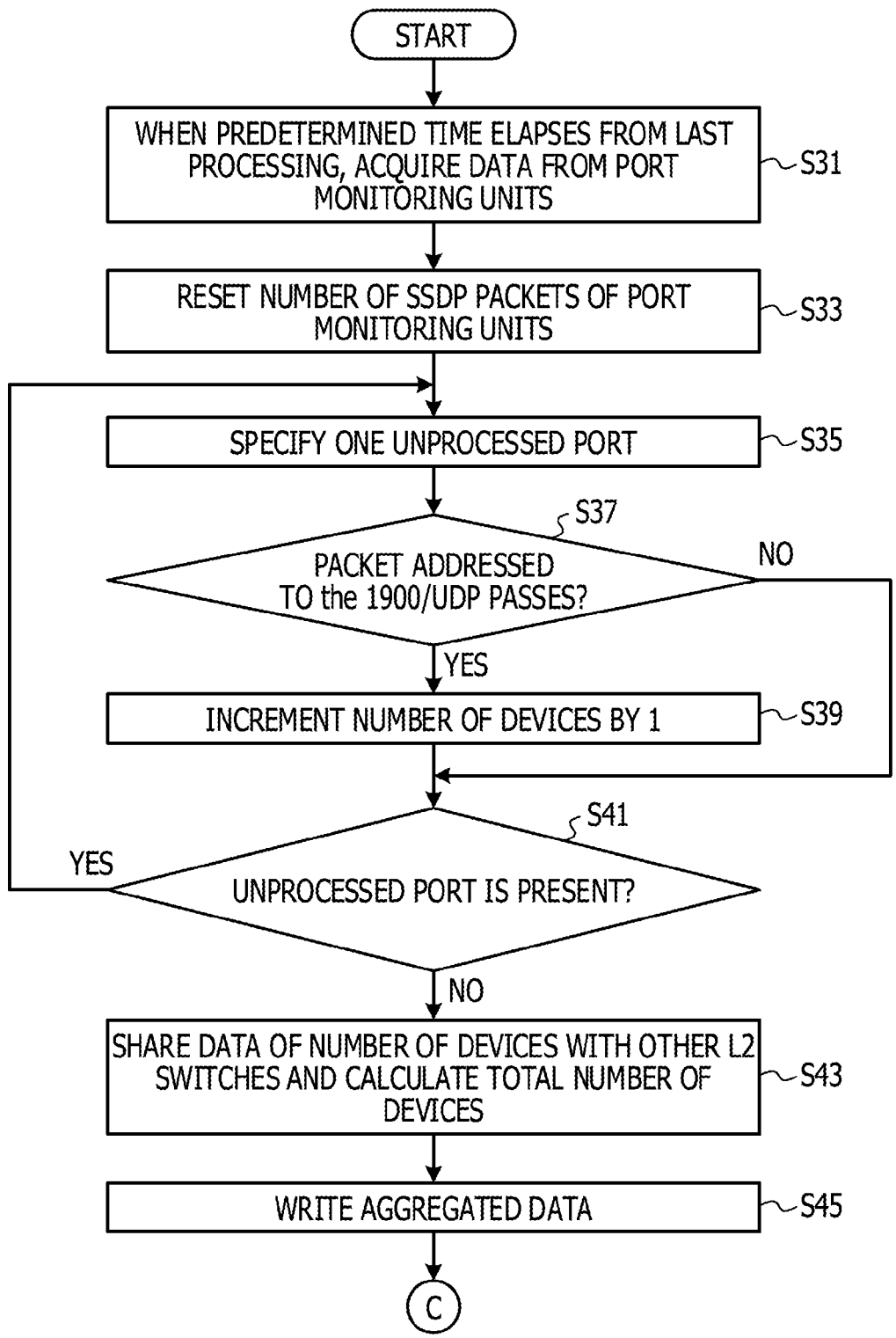
FIG. 8 is a diagram illustrating a processing flow of processing executed by a determining unit.

FIG. 8 is a diagram illustrating a processing flow of the processing executed by the determining unit 1051.

When the predetermined time elapses from the last processing, the determining unit 1051 acquires, from the port monitoring units, the latest numbers of transmitted SSDP multicast packets and the latest numbers of received SSDP unicast packets (step S31 in FIG. 8).

The determining unit 1051 resets the numbers of transmitted SSDP multicast packets and the numbers of received SSDP unicast packets managed by the port monitoring units (step S33). Specifically, the determining unit 1051 sets 0 in the numbers of transmitted SSDP multicast packets and the numbers of received SSDP unicast packets managed by the port monitoring units.

The determining unit 1051 determines one unprocessed port among the ports 11*a* to 15*a* (step S35). In the following explanation, the port specified in step S35 is referred to as target port.

The determining unit 1051 determines whether a packet addressed to the 1900/UDP (that is, a UDP packet, a destination port number of which is 1900) has passed a target port (step S37). Whether the packet addressed to the 1900/UDP has passed the target port is determined according to, for example, whether the number of SSDP packets counted concerning the target port is 0.

When the packet addressed to the 1900/UDP has not passed the target port (No route in step S37), the processing shifts to step S41. On the other hand, when the packet addressed to the 1900/UDP has passed the target port (Yes route in step S37), the determining unit 1051 increments information concerning the number of UPnP devices subordinate to the L2 switch 1*a* by one (step S39).

The determining unit 1051 determines whether an unprocessed port is present (step S41). When an unprocessed port is present (Yes route in S41), the processing returns to step S35.

On the other hand, when an unprocessed port is absent (No route in step S41), the determining unit 1051 shares information concerning the number of UPnP devices with the other L2 switches and calculates a total number of UPnP devices in the network (step S43). In step S43, the information concerning the number of UPnP devices is shared by communication conforming to a protocol such as a Link Layer Discovery Protocol (LLDP). The total number of UPnP devices in the network is calculated according to a sum of the numbers of UPnP devices subordinate to the L2 switches.

The determining unit 1051 stores, in the aggregated-data storing unit 103, the total number of UPnP devices calculated in step S43, the latest number of transmitted SSDP multicast packets and the latest number of received SSDP unicast packets, and a packet ratio (step S45). The processing shifts to step S47 in FIG. 12 via a terminal C. The packet ratio is calculated by, for example, (the number of received SSDP unicast packets)/(the number of transmitted SSDP multicast packets).

Examples of data stored in the aggregated-data storing unit 103 are illustrated in FIGS. 9 to 11. FIG. 9 is a diagram illustrating an example of data based on the number of transmitted SSDP multicast packets and the number of received SSDP unicast packets acquired from the port monitoring unit 1013. FIG. 10 is a diagram illustrating an example of data based on the number of transmitted SSDP multicast packets and the number of received SSDP unicast packets acquired from the port monitoring unit 1017. FIG. 11 is a diagram illustrating an example of data based on the number of transmitted SSDP multicast packets and the number of received SSDP unicast packets acquired from the port monitoring unit 1019.

Figure 12:
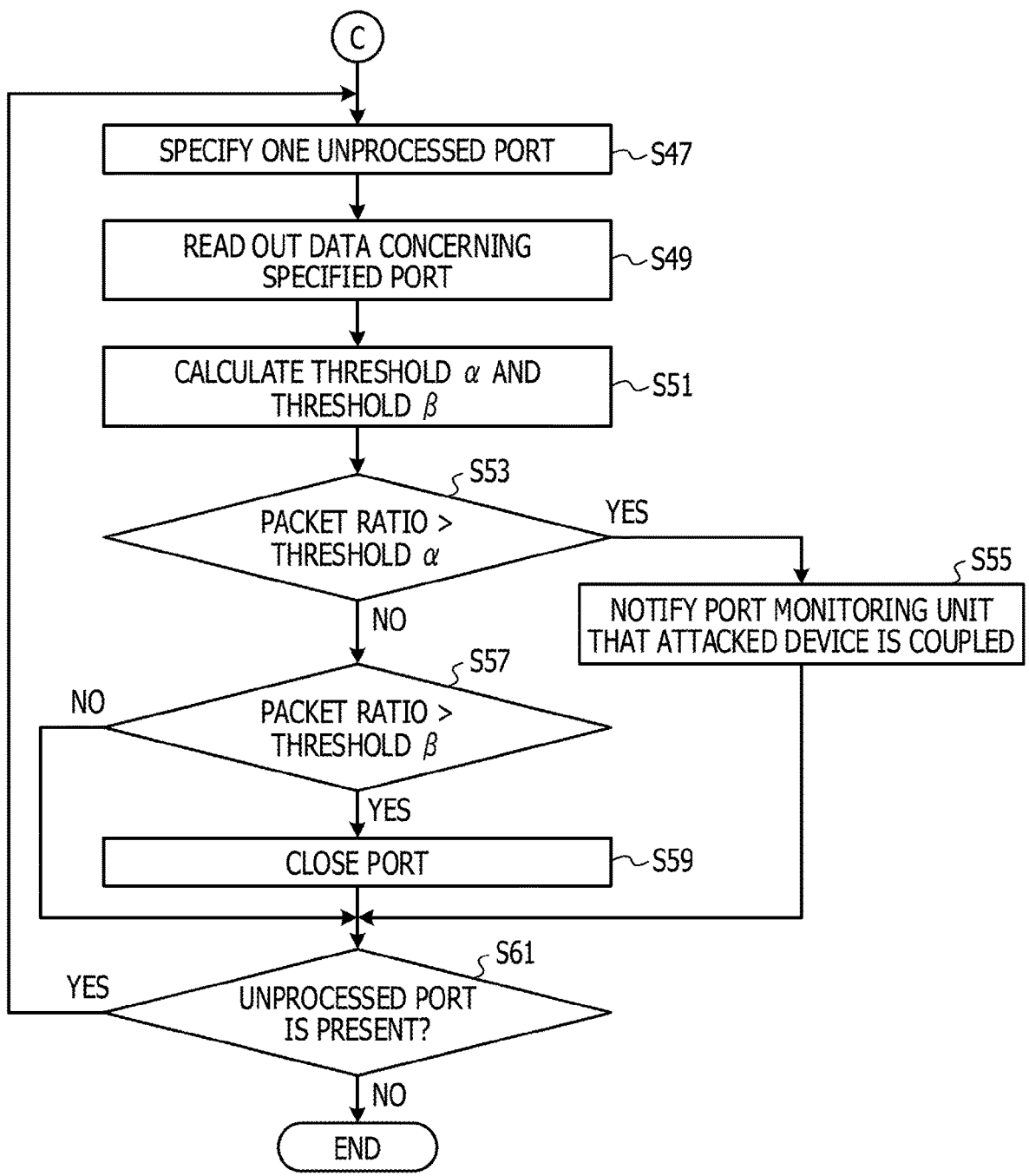
FIG. 12 is a diagram illustrating a processing flow of processing executed by the determining unit.

Referring to FIG. 12, the determining unit 1051 specifies one unprocessed port among the ports 11*a* to 15*a* (step S47 in FIG. 12). In the following explanation, the port specified in step S47 is referred to as target port.

The determining unit 1051 reads out, from the aggregated-data storing unit 103, data concerning the port specified in step S47 (step S49).

The determining unit 1051 instructs the calculating unit 1053 to calculate a threshold. In response to the instruction, the calculating unit 1053 calculates, based on statistical amounts of the packet ratio included in the data read out in step S49, the threshold α and the threshold β (step S51). The statistical amounts are, for example, an average and a standard deviation.

The threshold α and the threshold β are explained with reference to FIGS. 13 to 15.

Figure 13:
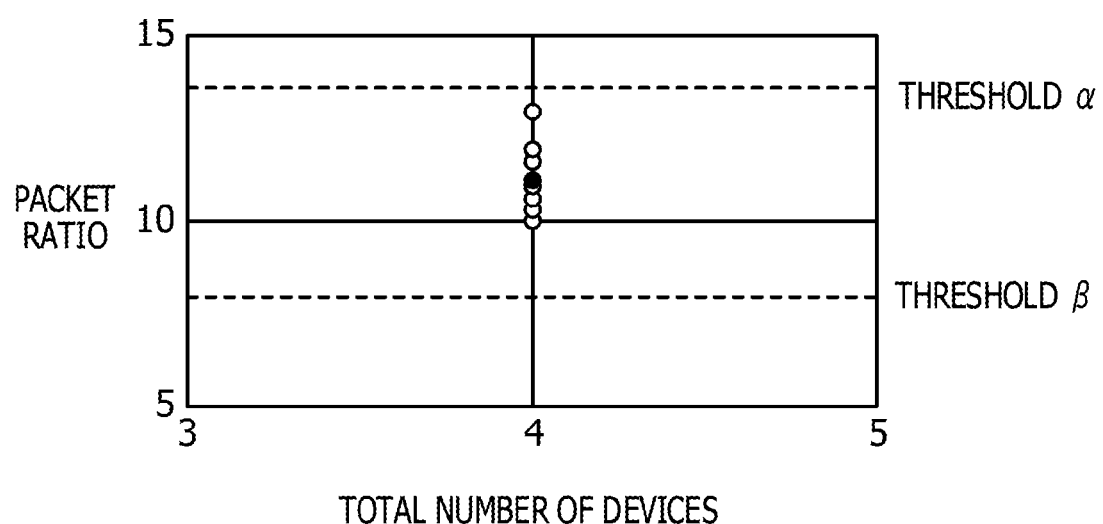
FIG. 13 is a diagram for explaining a threshold α and a threshold β.

FIG. 13 is a diagram illustrating the threshold α and the threshold β calculated from data concerning the port 12a. In FIG. 13, the horizontal axis represents a total number of devices and the vertical axis represents a packet ratio. Unhatched circles represent packet ratios at the time when the total number of devices is four. A hatched circle represents an average of packet ratios at the time when the total number of devices is four. In this embodiment, a value obtained by adding a predetermined value to the average of packet ratios is calculated as the threshold α. A value obtained by subtracting the predetermined value from the average of packet ratios is calculated as the threshold β. The predetermined value is, for example, 2.58*the standard deviation but may be other values.

Figure 14:
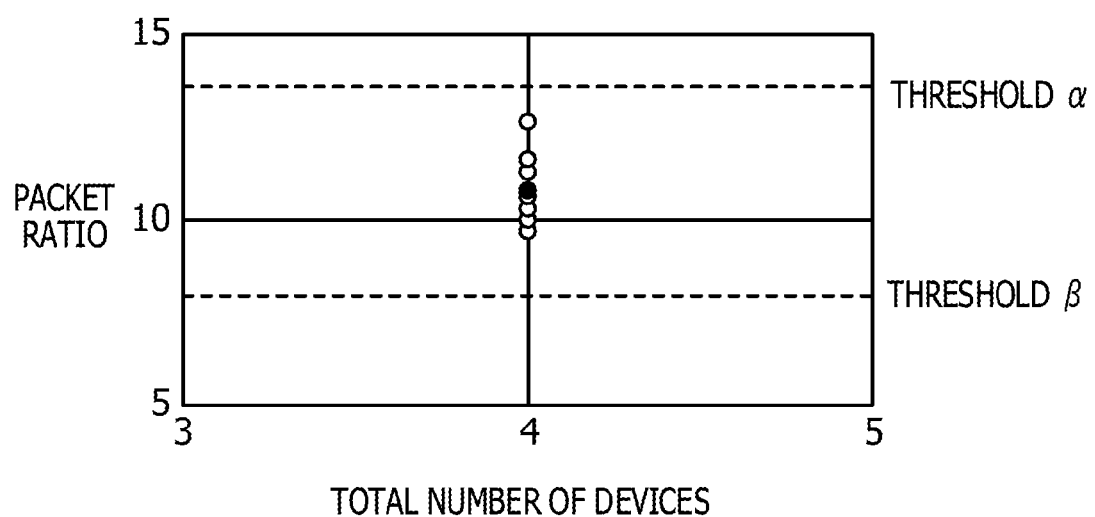
FIG. 14 is a diagram for explaining the threshold α and the threshold β.
Figure 15:
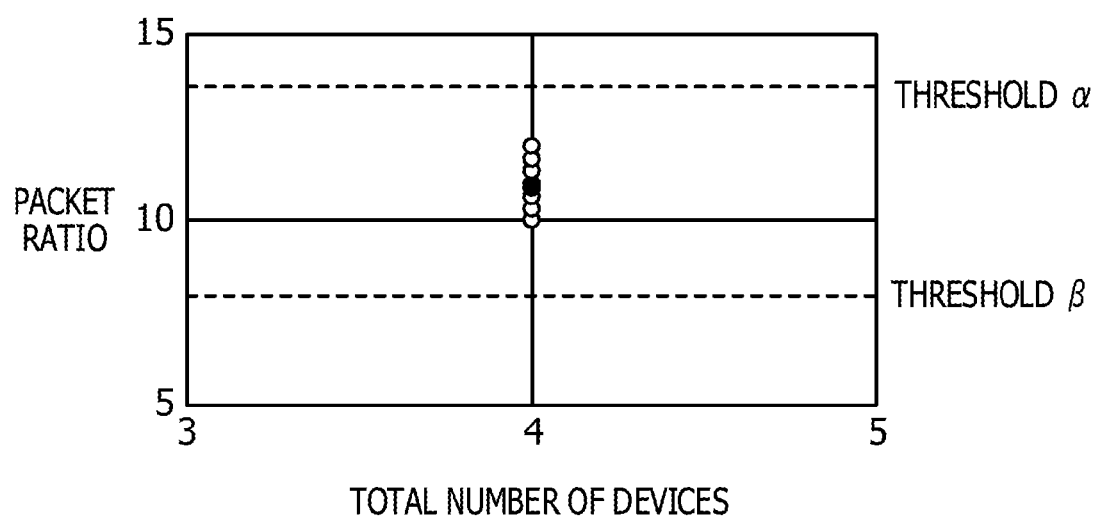
FIG. 15 is a diagram for explaining the threshold α and the threshold β.

FIG. 14 is a diagram illustrating the threshold α and the threshold β calculated from data concerning the port 14a. FIG. 15 is a diagram illustrating the threshold α and the threshold β calculated from data concerning the port 15a. In this way, the threshold α and the threshold β are different for each of the ports. The threshold α and the threshold β are calculated for each of the total numbers of devices.

Figure 16:
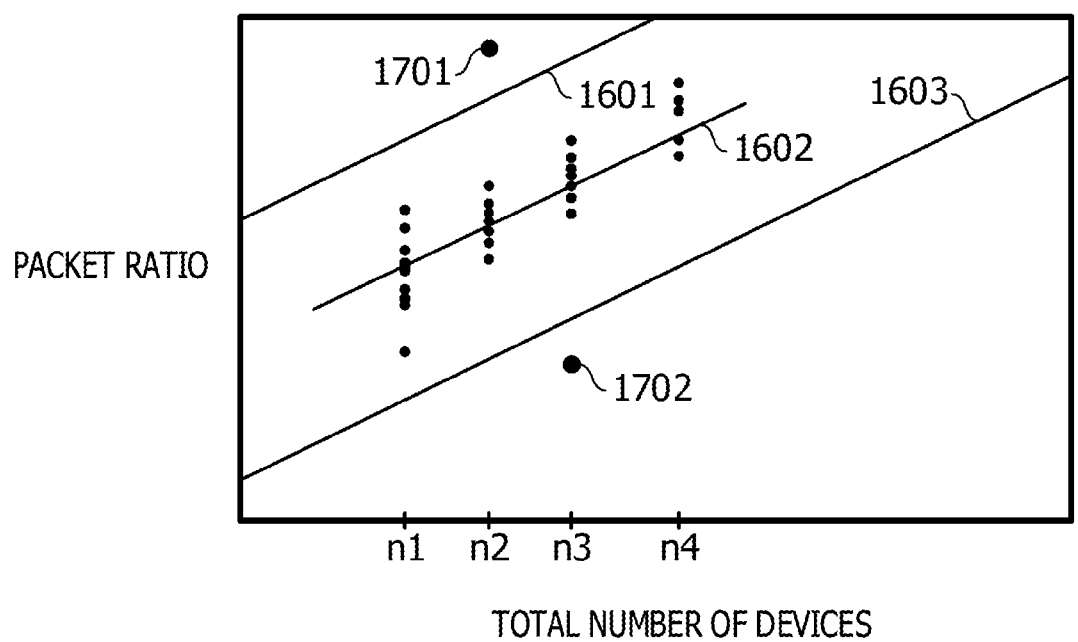
FIG. 16 is a diagram illustrating a distribution of packet ratios corresponding to total numbers of devices.

FIG. 16 is a diagram illustrating a distribution of packet ratios corresponding to the total numbers of devices. In FIG. 16, the horizontal axis represents the total number of packets and the vertical axis represents the packet ratio. A straight line 1601 is an approximate straight line of the threshold α. A straight line 1602 is an approximate straight line of the average of packet ratios. A straight line 1603 is an approximate straight line of the threshold β. A point 1701 is a packet ratio calculated when the total number of devices is n2. A point 1702 is a packet ratio calculated when the total number of devices is n3. As it is evident from FIG. 16, values of the threshold α and the threshold β increase as the total number of devices increases. Therefore, when the total number of devices is n2, the packet ratio corresponding to the point 1701 is larger than the threshold α. However, when the total number of devices is n4, the packet ratio corresponding to the point 1701 is smaller than the threshold α. When the total number of devices is n3, the packet ratio corresponding to the point 1702 is smaller than the threshold β. However, when the total number of devices is n1, the packet ratio corresponding to the point 1702 is larger than the threshold β. Therefore, even if the absolute value of the packet ratio and a fixed threshold are compared, occurrence of a reflector attack may be unable to be appropriately detected. However, if the threshold is dynamically set according to the total number of devices, occurrence of a reflector attack may be able to be appropriately detected.

Referring back to FIG. 12, the determining unit 1051 determines whether the packet ratio stored in the aggregated-data storing unit 103 in step S45 is larger than the threshold α (step S53).

When the packet ratio stored in the aggregated-data storing unit 103 in step S45 is larger than the threshold α (Yes route in step S53), the determining unit 1051 executes the following processing. Specifically, the determining unit 1051 notifies the port monitoring unit for the target port that the control point 31a, which is an attacked device, is coupled to the target port (step S55). The processing shifts to step S61. Consequently, it is possible to stop a packet from reaching the control point 31a, which is the attacked device.

On the other hand, when the packet ratio stored in the aggregated-data storing unit 103 in step S45 is not larger than the threshold α (No route in step S53), the determining unit 1051 determines whether the packet ratio stored in the aggregated-data storing unit 103 in step S45 is smaller than the threshold β (step S57).

When the packet ratio stored in the aggregated-data storing unit 103 in step S45 is not smaller than the threshold β (No route in step S57), the processing shifts to step S61.

On the other hand, when the packet ratio stored in the aggregated-data storing unit 103 in step S45 is smaller than the threshold β (Yes route in step S57), a UPnP device, which is an attacking device, is coupled to the target port. Therefore, the determining unit 1051 closes the target port (step S59). Consequently, a packet from the UPnP device, which is the attacking device, is not transferred on the network. Therefore, it is possible to reduce network traffic.

The determining unit 1051 determines whether an unprocessed port is present (step S61). When an unprocessed port is present (Yes route in step S61), the processing returns to step S47. On the other hand, when an unprocessed port is absent (No route in step S61), the processing ends.

As explained above, in this embodiment, the threshold and the packet ratio corresponding to the total number of devices in the network are compared. Therefore, it is possible to detect occurrence of a reflector attack without an error.

In the following explanation, detection of a reflector attack and specifying of an attacking device and an attacked device in the first embodiment are explained with reference to a specific example.

It is assumed that the number of SSDP packets is counted as illustrated in FIGS. 17 to 19. FIG. 17 is a diagram illustrating the number of SSDP packets counted by the port monitoring unit 1013. FIG. 18 is a diagram illustrating the number of SSDP packets counted by the port monitoring unit 1017. FIG. 19 is a diagram illustrating the number of SSDP packets counted by the port monitoring unit 1019.

When FIG. 17 and FIG. 5 are compared, the number of received SSDP unicast packets in an example illustrated in FIG. 17 is approximately 100 times the number of received SSDP unicast packets in the example illustrated in FIG. 5. When FIG. 18 and FIG. 6 are compared, the number of transmitted SSDP multicast packets and the number of received SSDP unicast packets in an example illustrated in FIG. 18 are the same degrees as the number of transmitted SSDP multicast packets and the number of received SSDP unicast packets in the example illustrated in FIG. 6. When FIG. 19 and FIG. 7 are compared, the number of transmitted SSDP multicast packets in an example illustrated in FIG. 19 is approximately 100 times the number of transmitted SSDP multicast packets in the example illustrated in FIG. 7.

It is assumed that data illustrated in FIGS. 20 to 22 are stored in the aggregated-data storing unit 103. FIG. 20 is data generated based on the number of SSDP packets counted by the port monitoring unit 1013. FIG. 21 is data generated based on the number of SSDP packets counted by the port monitoring unit 1017. FIG. 22 is data generated based on the number of SSDP packets counted by the port monitoring unit 1019.

When FIG. 20 and FIG. 9 are compared, whereas the packet ratio is approximately 1000 in an example illustrated in FIG. 20, the packet ratio is approximately 10 in the example illustrated in FIG. 9. When FIG. 21 and FIG. 10 are compared, the packet ratio is approximately 10 in an example illustrated in FIG. 21 and the packet ratio is also approximately 10 in the example illustrated in FIG. 10.

When FIG. 22 and FIG. 11 are compared, whereas the packet ratio is approximately 0.1 in an example illustrated in FIG. 22, the packet ratio is approximately 10 in the example illustrated in FIG. 11.

Figure 23:
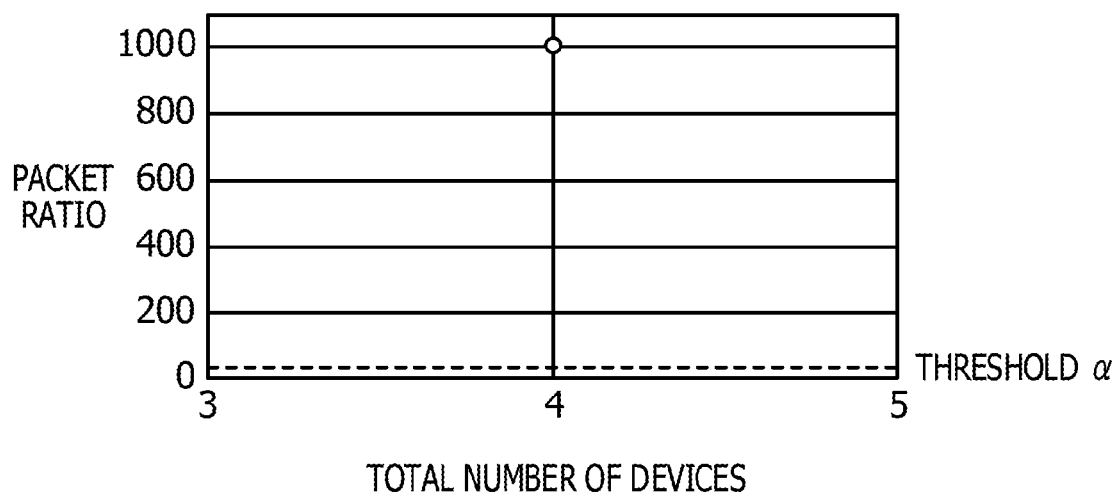
FIG. 23 is a diagram illustrating a relation between the packet ratio and the thresholds.
Figure 24:
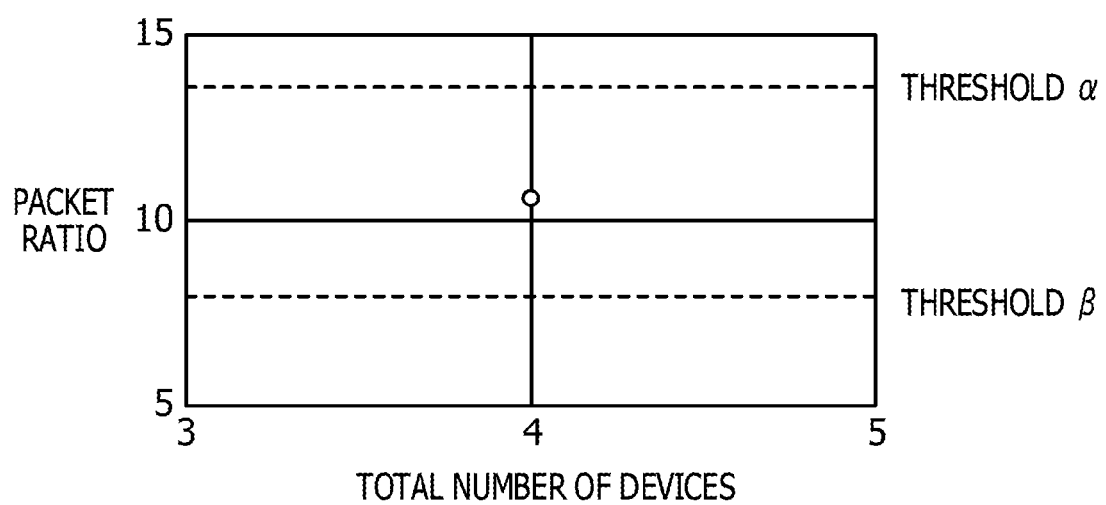
FIG. 24 is a diagram illustrating a relation between the packet ratio and the thresholds.
Figure 25:
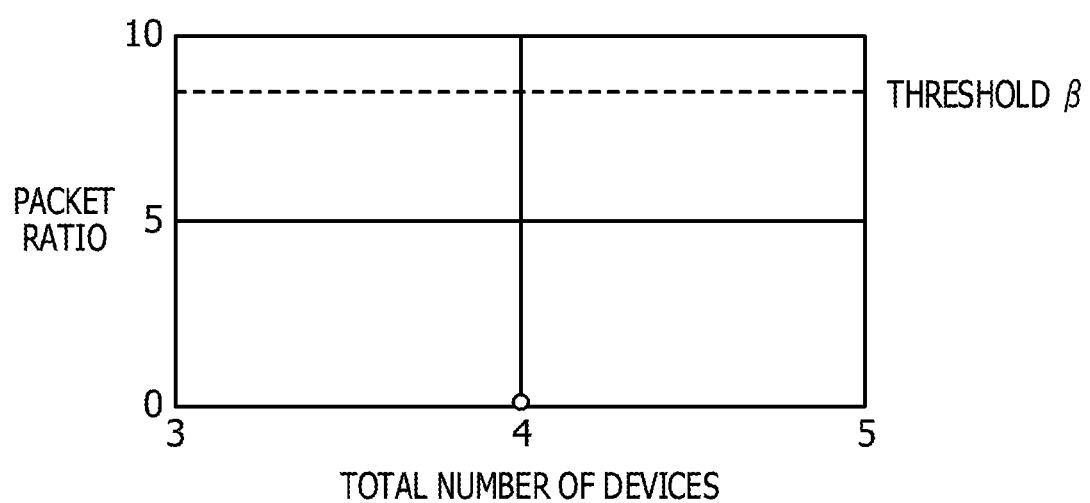
FIG. 25 is a diagram illustrating a relation between the packet ratio and the thresholds.

FIG. 23 is a diagram illustrating a relation between the packet ratio and the thresholds concerning the port 12a. FIG. 24 is a diagram illustrating a relation between the packet ratio and the thresholds concerning the port 14a. FIG. 25 is a diagram illustrating a relation between the packet ratio and the thresholds concerning the port 15a.

Figure 26:
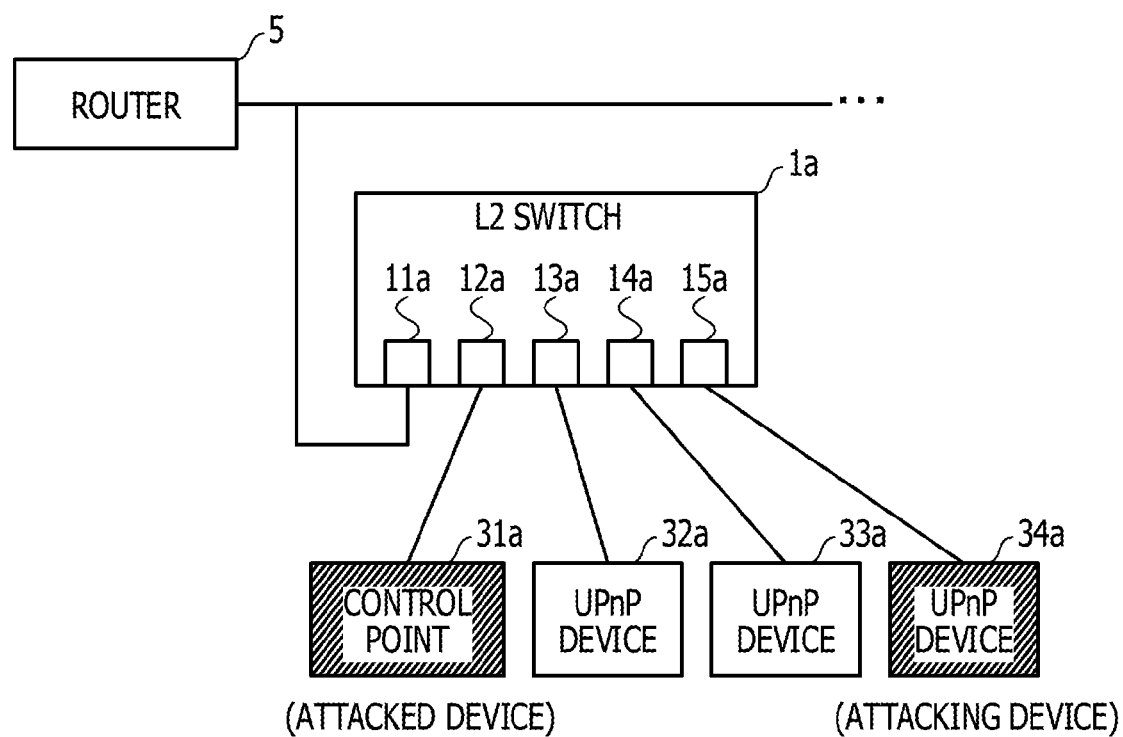
FIG. 26 is a diagram illustrating an attacking device and an attacked device in a system in the first embodiment.

As illustrated in FIG. 23, concerning the port 12a, the packet ratio is larger than the threshold α. As illustrated in FIG. 24, concerning the port 14a, the packet ratio is larger than the threshold β and smaller than the threshold α. As illustrated in FIG. 25, concerning the port 15a, the packet ratio is smaller than the threshold β. Therefore, it is determined that the control point 31a, which is the attacked device, is coupled to the port 12a, the UPnP device 33a, which is neither an attacked device nor an attacking device, is coupled to the port 14a, and the UPnP device 34a, which is an attacking device, is coupled to the port 15a as illustrated in FIG. 26.

The detection of a reflector attack and the specifying of an attacking device and an attacked device in the first embodiment are explained with reference to another specific example.

It is assumed that the numbers of SSDP packets are counted as illustrated in FIGS. 27 to 29. FIG. 27 is a diagram illustrating the numbers of SSDP packets counted by the port monitoring unit 1013. FIG. 28 is a diagram illustrating the numbers of SSDP packets counted by the port monitoring unit 1017. FIG. 29 is a diagram illustrating the numbers of SSDP packets counted by the port monitoring unit 1019.

When FIG. 27 and FIG. 5 are compared, the number of received SSDP unicast packets in an example illustrated in FIG. 27 is approximately 100 times the number of received SSDP unicast packets in the example illustrated in FIG. 5. When FIG. 28 and FIG. 6 are compared, the number of transmitted SSDP multicast packets in an example illustrated in FIG. 28 is approximately 50 times the number of transmitted SSDP multicast packets in the example illustrated in FIG. 6. When FIG. 29 and FIG. 7 are compared, the number of transmitted SSDP multicast packets in an example illustrated in FIG. 29 is approximately 50 times the number of transmitted SSDP multicast packets in the example illustrated in FIG. 7.

Figure 30:
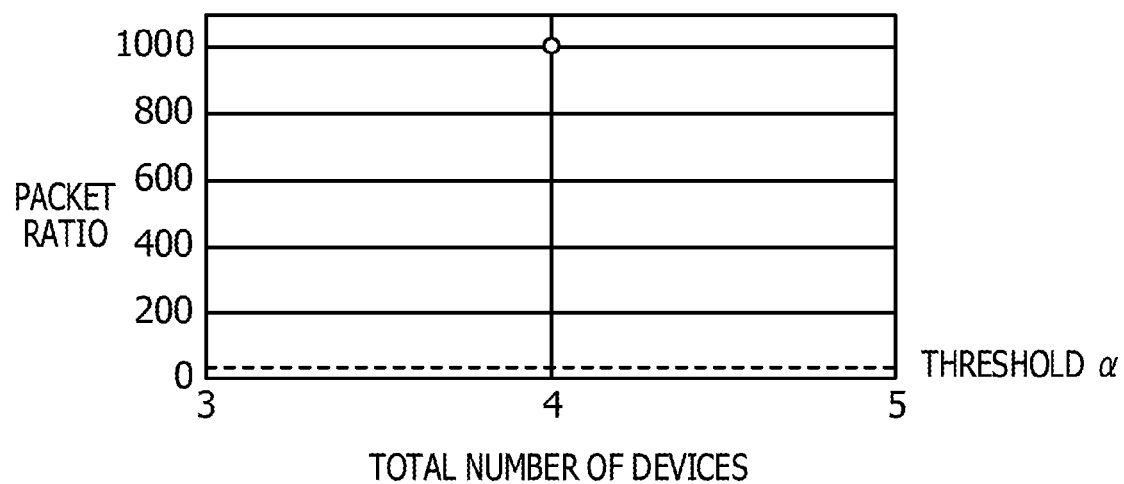
FIG. 30 is a diagram illustrating a relation between the packet ratio and the thresholds.
Figure 31:
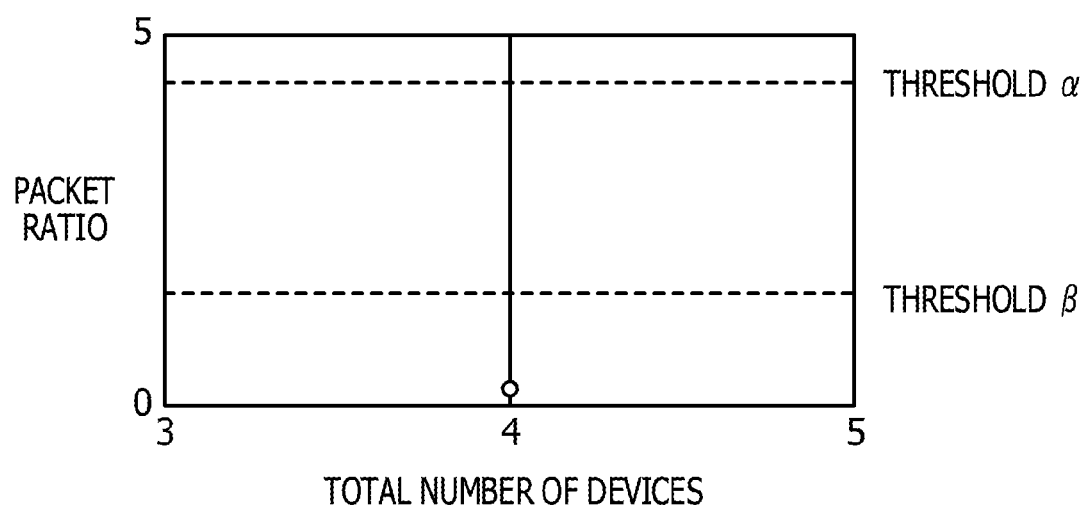
FIG. 31 is a diagram illustrating a relation between the packet ratio and the thresholds.
Figure 32:
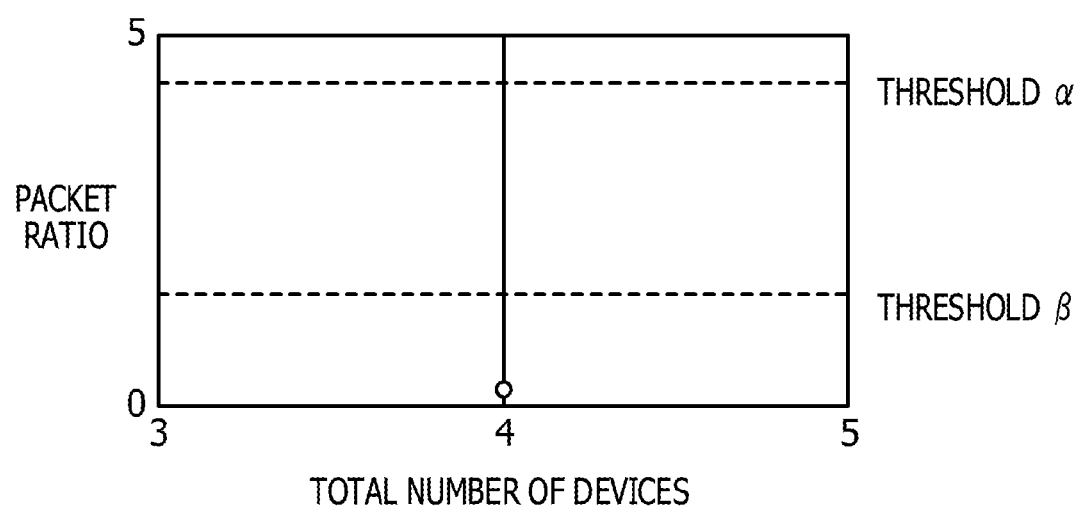
FIG. 32 is a diagram illustrating a relation between the packet ratio and the thresholds.

FIG. 30 is a diagram illustrating a relation between the packet ratio and the thresholds concerning the port 12a. FIG. 31 is a diagram illustrating a relation between the packet ratio and the thresholds concerning the port 14a. FIG. 32 is a diagram illustrating a relation between the packet ratio and the thresholds concerning the port 15a.

Figure 33:
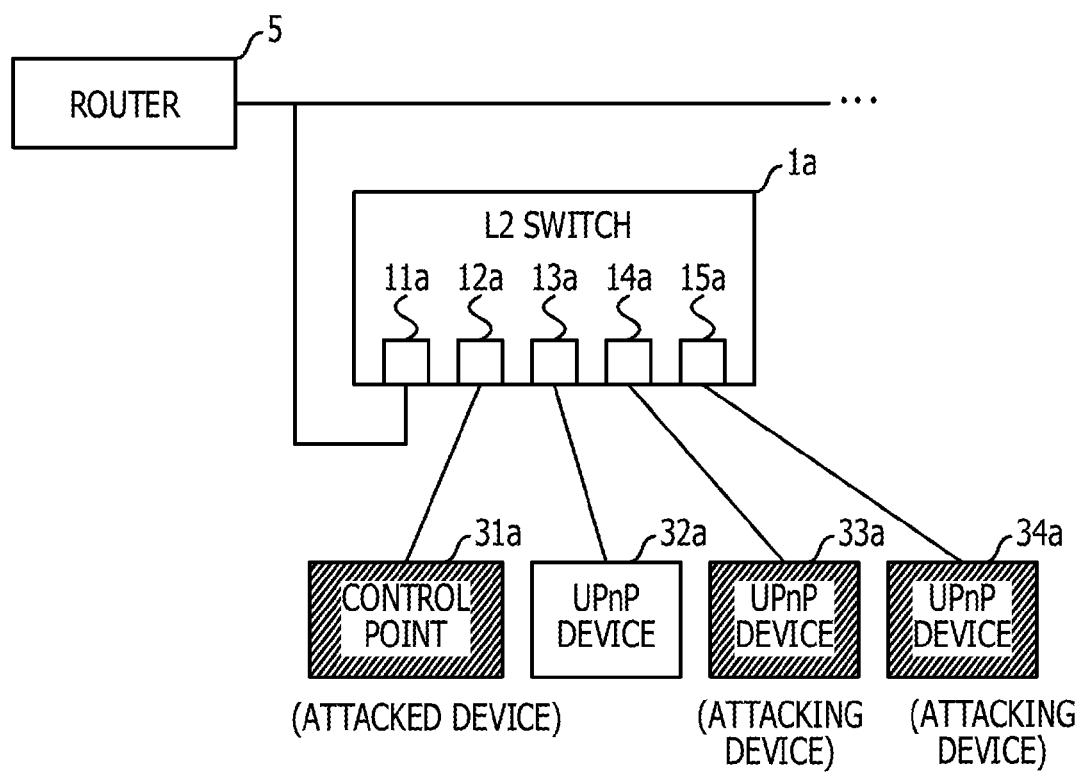
FIG. 33 is a diagram illustrating an attacking device and an attacked device in the system in the first embodiment.

As illustrated in FIG. 30, concerning the port 12a, the packet ratio is larger than the threshold α. As illustrated in FIG. 31, concerning the port 14a, the packet ratio is smaller than the threshold β. As illustrated in FIG. 32, concerning the port 15a, the packet ratio is smaller than the threshold β. Therefore, it is determined that the control point 31a, which is the attacked device, is coupled to the port 12a, the UPnP device 33a, which is an attacking device, is coupled to the port 14a, and the UPnP device 34a, which is the attacking device, is coupled to the port 15a as illustrated in FIG. 33.

When a reflector attack occurs in the network, a UPnP device that is transmitting an abnormal number of SSDP packets by multicast is present and a UPnP device that is receiving the abnormal number of SSDP packets is present. However, the number of SSDP packets transmitted by one UPnP device sufficient for occupation of the network fluctuates according to a total number of UPnP devices in the network.

Therefore, it is possible to detect a reflector attack by setting the thresholds according to the total number of UPnP devices in the network. Since the thresholds are automatically set, a work load on a network administrator does not occur.

It is possible to stop the network from being occupied by packets related to the reflector attack by specifying a UPnP device, which is an attacking device, and a control point, which is an attacked device, and executing measures against a port related to the reflector attack.

Second Embodiment

Figure 34:
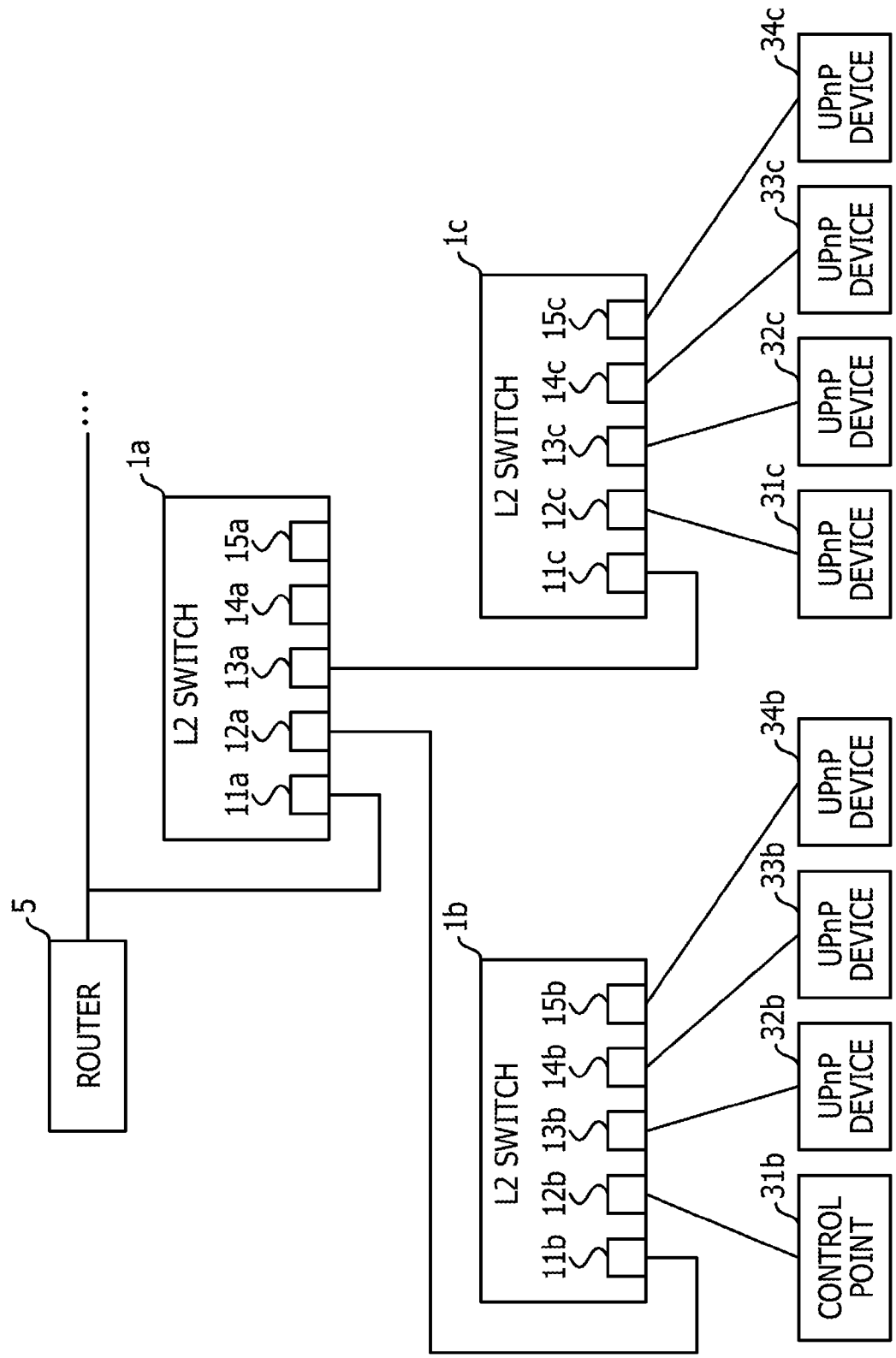
FIG. 34 is a diagram illustrating a system overview in a second embodiment.

FIG. 34 is a diagram illustrating a system overview in a second embodiment. L2 switches 1a to 1c are coupled to the same network (for example, LAN). The L2 switch 1a is coupled to the router 5 via the port 11a, coupled to a port 11b of the L2 switch 1b via the port 12a, and coupled to a port 11c of the L2 switch 1c via the port 13a. The L2 switch 1b is coupled to a control point 31b via a port 12b, coupled to a UPnP device 32b via a port 13b, coupled to a UPnP device 33b via a port 14b, and coupled to a UPnP device 34b via a port 15b. The L2 switch 1c is coupled to a UPnP device 31c via a port 12c, coupled to a UPnP device 32c via a port 13c, coupled to a UPnP device 33c via a port 14c, and coupled to a UPnP device 34c via a port 15c.

A functional block configuration of the L2 switches 1a to 1c is the same as a functional block configuration of the L2 switch 1a in the first embodiment.

In the following explanation, detection of a reflector attack and specifying of an attacking device and an attacked device in the second embodiment is explained with reference to a specific example.

It is assumed that the number of SSDP packets is counted as illustrated in FIGS. 35 to 37 in a state in which a reflector attack does not occur. FIG. 35 is a diagram illustrating the number of SSDP packets counted concerning the port 12b of the L2 switch 1b. FIG. 36 is a diagram illustrating the number of SSDP packets counted concerning the port 12c of the L2 switch 1c. FIG. 37 is a diagram illustrating the number of SSDP packets counted concerning the port 15c of the L2 switch 1c.

It is assumed that data illustrated in FIGS. 38 to 40 are stored in the aggregated-data storing unit 103. FIG. 38 is data generated based on the number of SSDP packets counted concerning the port 12b of the L2 switch 1b. FIG. 39 is data generated based on the number of SSDP packets counted concerning the port 12c of the L2 switch 1c. FIG. 40 is data generated based on the number of SSDP packets counted concerning the port 15c of the L2 switch 1c.

It is assumed that the number of SSDP packets is counted as illustrated in FIGS. 41 to 43 according to occurrence of a reflector attack. FIG. 41 is a diagram illustrating the number of SSDP packets counted concerning the port 12b of the L2 switch 1b. FIG. 42 is a diagram illustrating the number of SSDP packets counted concerning the port 12c of the L2 switch 1c. FIG. 43 is a diagram illustrating the number of SSDP packets counted concerning the port 15c of the L2 switch 1c.

When FIG. 41 and FIG. 35 are compared, the number of received SSDP unicast packets in an example illustrated in FIG. 41 is approximately 100 times the number of received SSDP unicast packets in the example illustrated in FIG. 35. When FIG. 42 and FIG. 36 are compared, the number of transmitted SSDP multicast packets and the number of received SSDP unicast packets in an example illustrated in FIG. 42 are the same degrees as the number of transmitted SSDP multicast packets and the number of received SSDP unicast packets in the example illustrated in FIG. 36. When FIG. 43 and FIG. 37 are compared, the number of transmitted SSDP multicast packets in an example illustrated in FIG. 43 is approximately 100 times the number of transmitted SSDP multicast packets in the example illustrated in FIG. 37.

Figure 44:
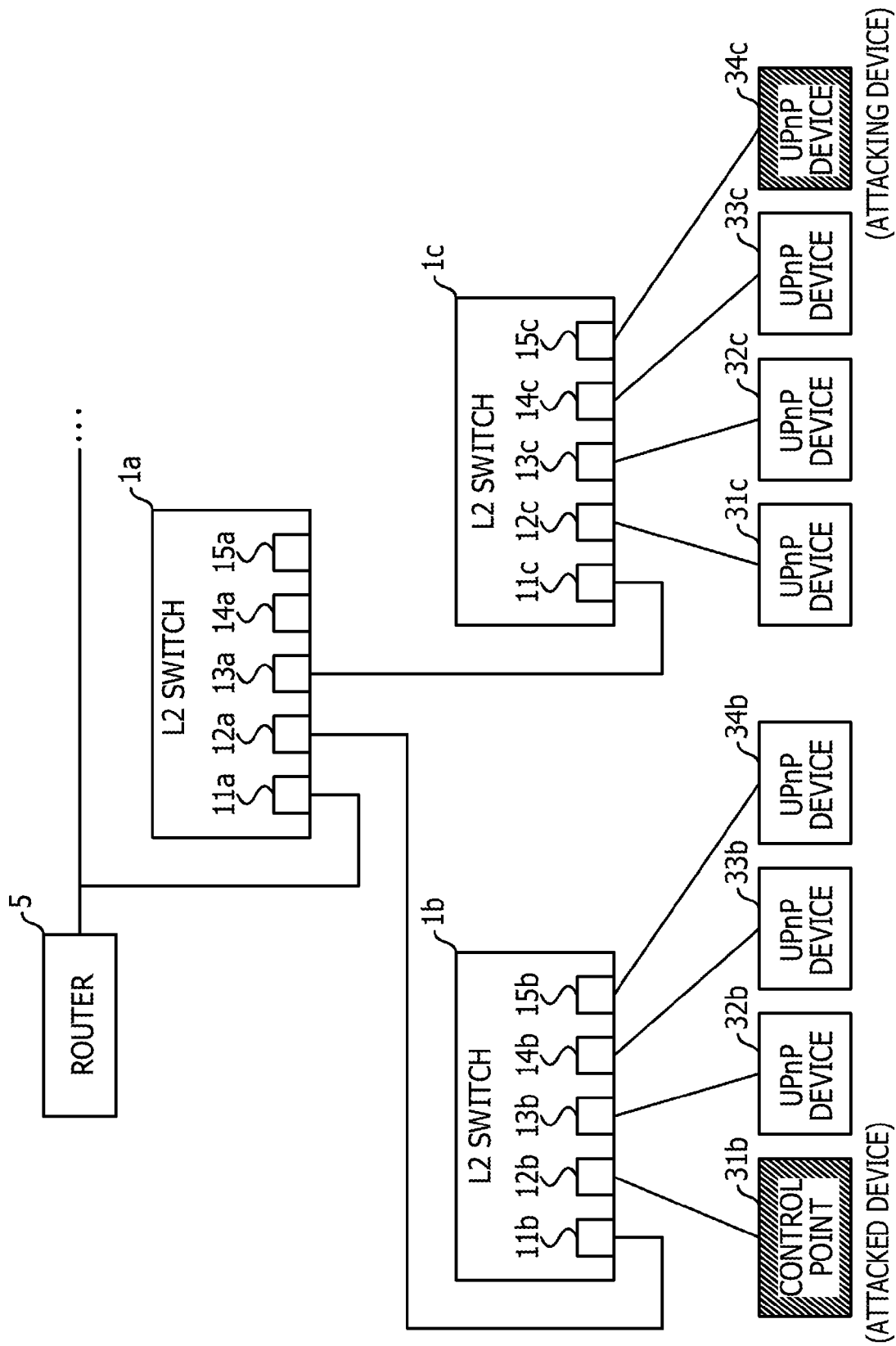
FIG. 44 is a diagram illustrating an attacking device and an attacked device in a system in the second embodiment.

Therefore, it is determined that the control point 31$b$, which is an attacked device, is coupled to the port 12$b$ of the L2 switch 1$b$, the UPnP device 31$c$, which is neither an attacked device nor an attacking device, is coupled to the port 12$c$ of the L2 switch 1$c$, and the UPnP device 34$c$, which is an attacking device, is coupled to the port 15$c$ of the L2 switch 1$c$ as illustrated in FIG. 44.

As explained above, even when the L2 switches are coupled in multiple stages, it is possible to detect a reflector attack if the method in this embodiment is used. It is possible to specify a UPnP device, which is an attacking device, and a control point, which is an attacked device.

Third Embodiment

Figure 45:
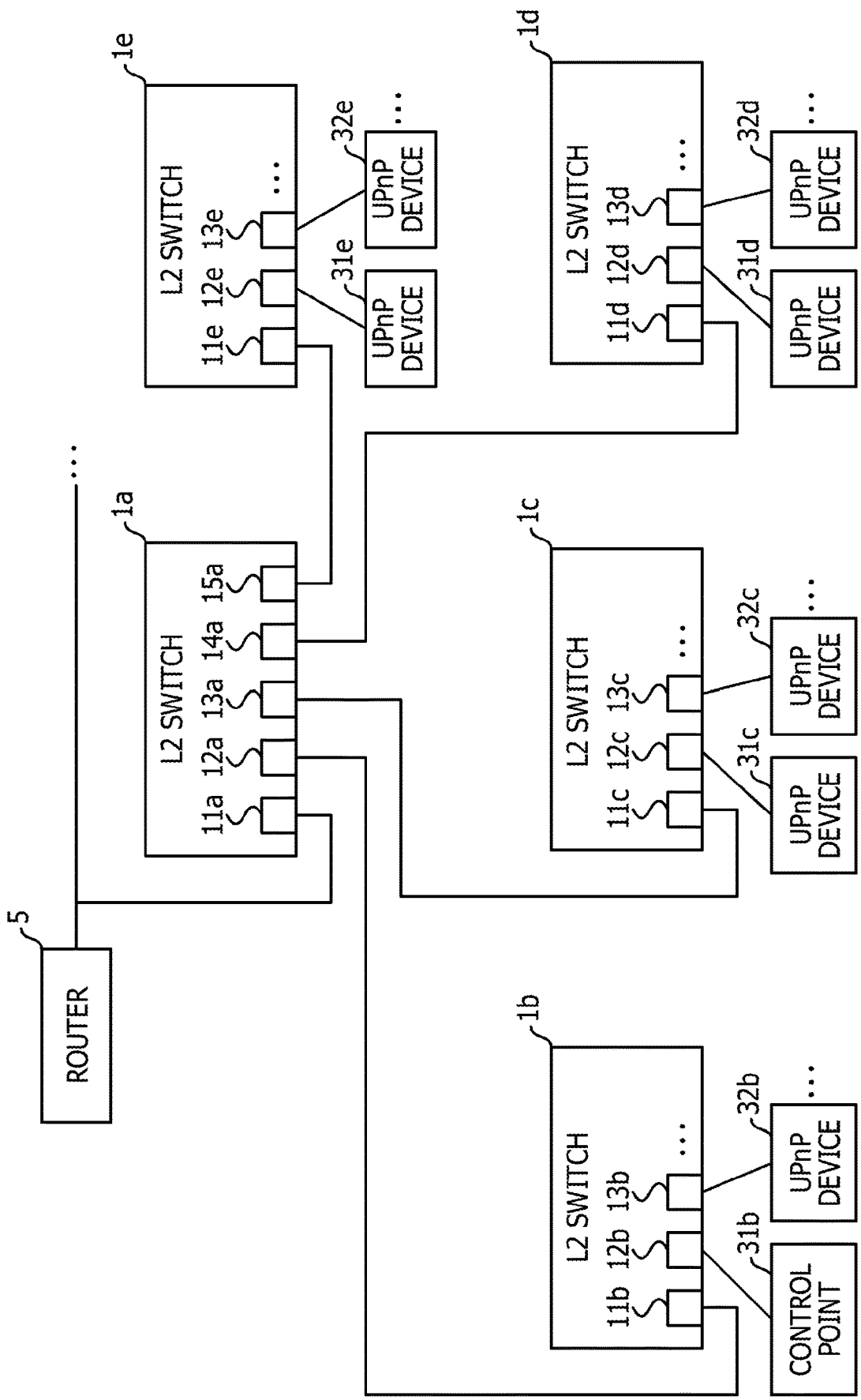
FIG. 45 is a diagram illustrating a system overview in a third embodiment.

FIG. 45 is a diagram illustrating a system overview in a third embodiment. L2 switches 1$a$ to 1$e$ are coupled to the same network (for example, LAN). The L2 switch 1$a$ is coupled to the router 5 via the port 11$a$, coupled to the port 11$b$ of the L2 switch 1$b$ via the port 12$a$, coupled to the port 11$c$ of the L2 switch 1$c$ via the port 13$a$, coupled to a port 11$d$ of the L2 switch 1$d$ via the port 14$a$, and coupled to a port 11$e$ of the L2 switch 1$e$ via the port 15$a$.

Each of the L2 switches 1$b$ to 1$e$ includes N (N is a natural number equal to or larger than 2) ports. Devices (specifically, a control point or UPnP devices) other than the L2 switch 1$a$ are coupled to (N−1) ports among the N ports. The control point 31$b$ and (N−2) UPnP devices are coupled to the L2 switch 1$b$. (N−1) UPnP devices are coupled to the L2 switches 1$c$ to 1$e$.

In a system in the third embodiment as well, it is assumed that a packet ratio of the control point and a packet ratio of the UPnP devices at the time when a reflector attack does not occur is approximately 10.

A functional block configuration of the L2 switches 1$a$ to 1$e$ is the same as the functional block configuration of the L2 switch 1$a$ in the first embodiment.

It is assumed that the number of SSDP packets is counted as illustrated in FIGS. 46 to 48 according to occurrence of a reflector attack. FIG. 46 is a diagram illustrating the number of SSDP packets counted concerning the port 12$b$ of the L2 switch 1$b$. FIG. 47 is a diagram illustrating the number of SSDP packets counted concerning the port 13$c$ of the L2 switch 1$c$. FIG. 48 is a diagram illustrating the number of SSDP packets counted concerning a port 13$d$ of the L2 switch 1$d$. It is assumed that the same counting results as the counting results illustrated in FIGS. 47 and 48 are obtained concerning ports to which the UPnP devices other than the UPnP device 32$c$ and a UPnP device 32$d$ are coupled.

From the counting result illustrated in FIG. 46, it is assumed that the control point 31$b$ coupled to the port 12$b$ of the L2 switch 1$b$ is an attacked device. However, a UPnP device, which is an attacking device, may be unable to be specified from the counting results illustrated in FIGS. 47 and 48.

Figure 49:
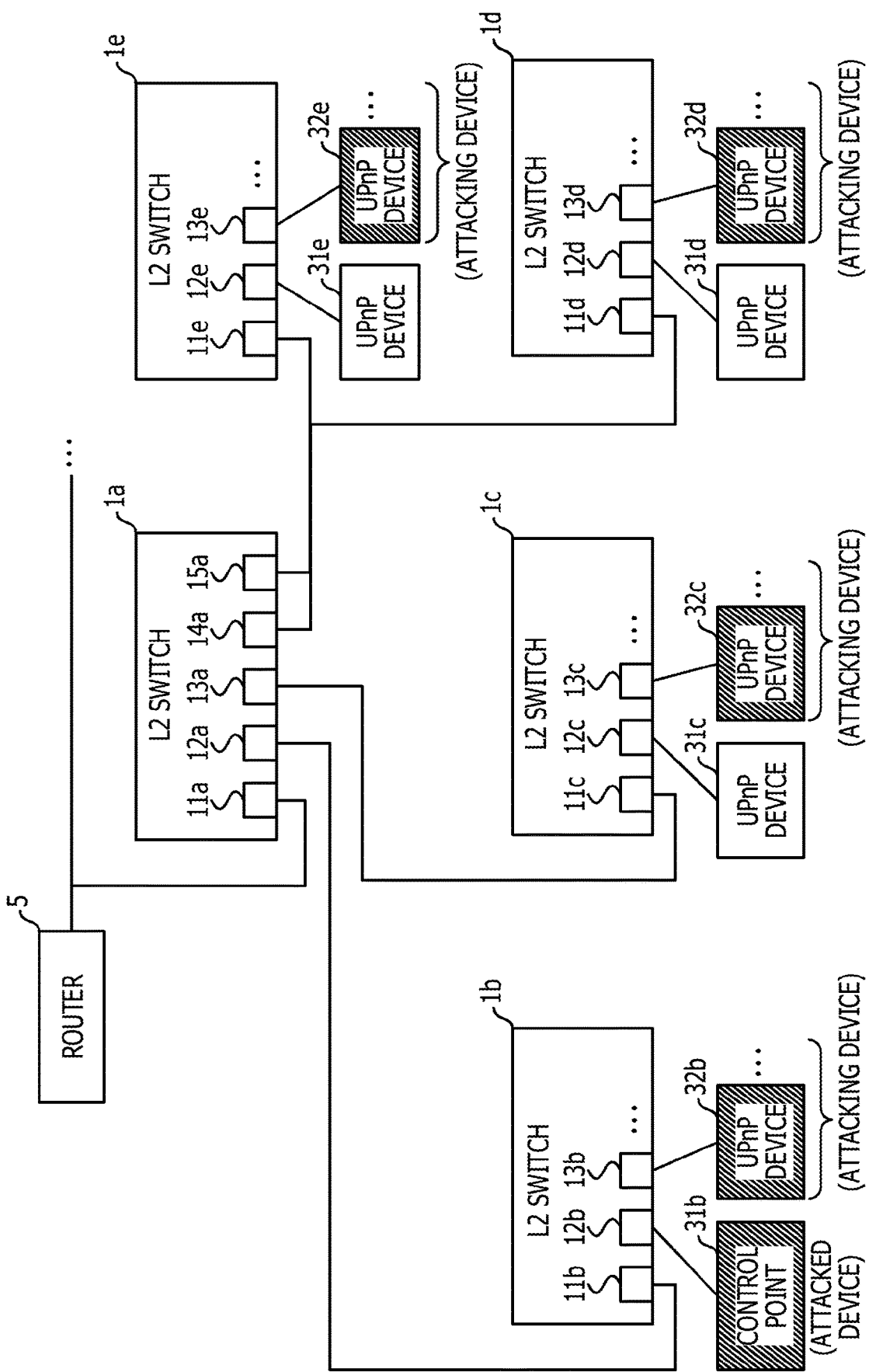
FIG. 49 is a diagram illustrating an attacking device and an attacked device in a system in the third embodiment.

For example, it is assumed that two or more UPnP devices subordinate to each of the L2 switches 1$b$ to 1$e$ are attacking devices as illustrated in FIG. 49. When a large number of UPnP devices in the network are attacking devices, the UPnP devices may be able to occupy the network even if the number of M-SEARCH requests per UPnP device is small. Therefore, the counting results illustrated in FIGS. 47 and 48 are sometimes obtained. Therefore, an attacking device may not be able to be specified when a large number of attacking devices are present in the network. However, since an attacked device may be able to be specified, it is possible to discard packets addressed to the attacked device.

The embodiments of the present disclosure are explained above. However, the present disclosure is not limited to this. For example, the functional block configuration of the L2 switches 1$a$ to 1$e$ explained above sometimes does not coincide with an actual program module configuration.

The table configurations explained above are examples. The tables do not have to be configured as explained above. Further, in the processing flows, the order of the processing may be able to be changed if processing results do not change. Further, the processing may be executed in parallel.

The threshold calculating methods explained above are examples. The thresholds may be calculated by other methods.

A packet ratio during occurrence of a reflector attack may be excluded from a plurality of packet ratios used for the calculation of the thresholds.

Note that the L2 switches 1$a$ to 1$e$ explained above sometimes have a configuration in which, as illustrated in FIG. 50, a memory 2601, a CPU 2603, a hard disk drive (HDD) 2605, a display control unit 2607 coupled to a display device 2609, a drive device 2613 for a removable disk 2611, an input device 2615, and communication control units 2617 (in FIG. 50, 2617$a$ to 2617$c$) for coupling to the network are coupled by a bus 2619. Note that, in some case, the display control unit 2607, the display device 2609, the drive device 2613, and the input device 2615 are not included. An operating system (OS) and application programs for carrying out the processing in the embodiments are stored in the HDD 2605. When the operating system and the application programs are executed by the CPU 2603, the operating system and the application programs are read out to the memory 2601 from the HDD 2605. The CPU 2603 controls the display control unit 2607, the communication control units 2617, and the drive device 2613 to perform preferable operation according to necessity. Note that data input via any one of the communication control units 2617 is output via the other communication control units 2617. The CPU 2603 controls the communication control units 2617 to appropriately switch an output destination. Data being processed is stored in the memory 2601 and is stored in the HDD 2605 if desirable. In an example of this technique, the application programs for carrying out the processing explained above are stored in a computer-readable removable disk 2611 and distributed and installed in the HDD 2605 from the drive device 2613. The application programs are sometimes installed in the HDD 2605 through a network such as the Internet and the communication control units 2617. In such a computer apparatus, the CPU 2603, hardware such as the memory 2601, the OS, and the application programs organically cooperate with one another to thereby realize the various functions explained above.

The embodiments of the present disclosure explained above are summarized as follows.

A relay device according to a first aspect of the embodiments includes (A) a counting unit (the port monitoring unit in the embodiments is an example of the counting unit) configured to count a first number, which is the number of packets of a predetermined protocol addressed to information processing devices coupled to ports of the relay device, and a second number, which is the number of packets of the predetermined protocol transmitted by the information processing devices coupled to the ports, and (B) a determining unit (the determining unit 1051 in the embodiments is an example of the determining unit) configured to determine, based on comparison of an index value calculated based on the first number and the second number and thresholds corresponding to the number of the information processing devices coupled to the relay device or other relay devices, whether an attack by an information processing device coupled to the relay device or the other relay devices occurs.

Since the number of appropriate thresholds changes according to the number of the information processing devices in a network, it is possible to appropriately detect occurrence of a reflector attack using the thresholds.

The thresholds may include a first threshold and a second threshold smaller than the first threshold. The relay device may further include (C) a calculating unit (the calculating unit 1053 in the embodiments is an example of the calculating unit) configured to specify, based on coupling information of the information processing devices and coupling information received from the other relay devices, the number of the information processing devices coupled to the relay device or the other relay devices and calculate, based on statistical amounts of the index value, the first threshold and the second threshold.

It is possible to calculate an appropriate first threshold and an appropriate second threshold using the statistical amounts.

The counting unit may discard the packets to the ports (a1) when the index value is larger than the first threshold. The determining unit may close the ports (b1) when the index value is smaller than the second threshold.

It is possible to stop the information processing device corresponding to an attacking device from transmitting a message such as M-SEARCH and stop the information processing device corresponding to an attacked device from receiving a large number of packets.

The index value may be a ratio of a first number to a second number.

It is inappropriate to perform the determination according to only the absolute number of the packets. If the ratio explained above is used, it is possible to appropriately perform the determination.

The first number may be the number of unicast packets of the predetermined protocol addressed to the information processing devices coupled to the ports. The second number may be the number of multicast packets of the predetermined protocol transmitted by the information processing devices coupled to the ports.

The predetermined protocol may be a communication protocol concerning detection and coupling of the information processing devices in the network.

An attack detecting method according to a second aspect of the embodiments includes processing for (D) counting a first number, which is the number of packets of a predetermined protocol addressed to information processing devices coupled to ports of a relay device, and a second number, which is the number of packets of the predetermined protocol transmitted by the information processing devices coupled to the ports, and (E) determining, based on comparison of an index value calculated based on the first number and the second number and thresholds corresponding to the number of the information processing devices coupled to the relay device or other relay devices, whether an attack by an information processing device coupled to the relay device or the other relay devices occurs.

Note that a computer program for causing a processor to perform the processing by the method may be able to be created. The computer program is stored in a computer-readable storage medium or storage device such as a flexible disk, a CD-ROM, a magneto-optical disk, a semiconductor memory, or a hard disk. Note that an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device coupled to a network including a plurality of information processing devices, the relay device comprising:
   a port configured to be coupled to any one of the plurality of information processing devices; and
   a processor coupled to the port and configured to:
      specify a first number which is a number of packets of a first communication protocol transmitted from the port,
      specify a second number which is a number of packets of the first communication protocol received at the port,
      determine, based on comparison of a ratio of the first number and the second number and a threshold corresponding to a third number which is a number of the plurality of information processing devices included in the network, whether an attack by at least one information processing device of the plurality of information processing devices occurs, and
      specify, based on a statistical amount of the ratio, the threshold,
   the threshold includes a first threshold and a second threshold smaller than the first threshold,
   the processor is configured to discard the packet received at the port when the ratio is greater than the first threshold and closes the port when the ratio is less than the second threshold.

2. The relay device according to claim 1, wherein the processor is configured to specify the third number, based on first coupling information indicating a coupling relation with the plurality of information processing devices held by the relay device and second coupling information indicating a coupling relation with the plurality of information processing devices obtained from another relay device.

3. The relay device according to claim 1, wherein the ratio is a ratio of the first number to the second number.

4. The relay device according to claim 1, wherein the first number is a number of unicast packets of the first protocol to a first information processing device coupled to the port among the plurality of information processing devices, and the second number is a number of multicast packets of the first protocol transmitted from the first information processing device and received by the port.

5. The relay device according to claim 1, wherein the first protocol is a simple service discovery protocol (SSDP).

6. A method using a relay device coupled to a network including a plurality of information processing devices, the relay device including a port coupled to any one of the plurality of information processing devices, the method comprising:
specifying a first number which is a number of packets of a first communication protocol transmitted from the port;
specifying a second number which is a number of packets of the first communication protocol received at the port;
determining, based on comparison of a ratio of the first number and the second number and a threshold corresponding to a third number which is a number of the plurality of information processing devices included in the network, whether an attack by at least one information processing device of the plurality of information processing devices occurs; and
specifying, based on a statistical amount of the ratio, the threshold,
the threshold includes a first threshold and a second threshold smaller than the first threshold,
the packet received at the port is discarded when the ratio is greater than the first threshold and closes the port when the ratio is less than the second threshold.

7. The method according to claim 6, further comprising:
specifying the third number, based on first coupling information indicating a coupling relation with the plurality of information processing devices held by the relay device and second coupling information indicating a coupling relation with the plurality of information processing devices obtained from another relay device.

8. The method according to claim 6, wherein the ratio is a ratio of the first number to the second number.

9. The method according to claim 6, wherein the first number is a number of unicast packets of the first protocol to a first information processing device coupled to the port among the plurality of information processing devices, and the second number is a number of multicast packets of the first protocol transmitted from the first information processing device and received by the port.

10. The method according to claim 6, wherein the first protocol is a simple service discovery protocol (SSDP).

11. A non-transitory computer-readable storage medium storing a program that causes an information processing apparatus to execute a process, the process comprising:
specifying a first number which is a number of packets of a first communication protocol transmitted from a port of a relay device which is coupled to a network including a plurality of information processing devices, the relay device including a port coupled to any one of the plurality of information processing devices;
specifying a second number which is a number of packets of the first communication protocol received at the port;
determining, based on comparison of a ratio of the first number and the second number and a threshold corresponding to a third number which is a number of the plurality of information processing devices included in the network, whether an attack by at least one information processing device of the plurality of information processing devices occurs; and
specifying, based on a statistical amount of the ratio, the threshold,
the threshold includes a first threshold and a second threshold smaller than the first threshold,
the packet received at the port is discarded when the ratio is greater than the first threshold and closes the port when the ratio is less than the second threshold.

12. The non-transitory computer-readable storage medium according to claim 11, the process further comprising:
specifying the third number, based on first coupling information indicating a coupling relation with the plurality of information processing devices held by the relay device and second coupling information indicating a coupling relation with the plurality of information processing devices obtained from another relay device.

13. The non-transitory computer-readable storage medium according to claim 11, wherein the ratio is a ratio of the first number to the second number.

14. The non-transitory computer-readable storage medium according to claim 11, wherein the first number is a number of unicast packets of the first protocol to a first information processing device coupled to the port among the plurality of information processing devices, and the second number is a number of multicast packets of the first protocol transmitted from the first information processing device and received by the port.

* * * * *